US005307276A

United States Patent [19]

Takahashi et al.

[11] Patent Number: 5,307,276

[45] Date of Patent: Apr. 26, 1994

[54] LEARNING CONTROL METHOD FOR FUEL INJECTION CONTROL SYSTEM OF ENGINE

[75] Inventors: Shinsuke Takahashi, Yokohama; Teruji Sekozawa, Kawasaki; Makoto Shioya, Tokyo, all of Japan

[73] Assignee: Hitachi, Ltd., Tokyo, Japan

[21] Appl. No.: 868,315

[22] Filed: Apr. 14, 1992

[30] Foreign Application Priority Data

Apr. 25, 1991 [JP] Japan .................................. 3-095489

[51] Int. Cl.[5] ........................ G06F 15/48; G06F 15/50

[52] U.S. Cl. ........................... 364/431.05; 364/431.01; 364/431.04; 123/492; 123/480

[58] Field of Search ....................... 364/431.05, 431.01, 364/431.04, 431.03, 431.07; 123/492, 493, 480, 478, 494, 440, 443, 326, 325, 675, 486, 399, 340, 435, 491

[56] References Cited

U.S. PATENT DOCUMENTS

| | | | |
|---|---|---|---|
| 4,220,120 | 9/1980 | Jackson et al. | 123/3 |
| 4,667,640 | 5/1987 | Sekozawa et al. | 123/492 |
| 4,858,136 | 8/1989 | Tanaka et al. | 364/431.07 |
| 4,919,094 | 4/1990 | Manaka et al. | 123/326 |
| 4,939,658 | 7/1990 | Sekozawa et al. | 364/431.06 |
| 4,953,530 | 9/1990 | Manaka et al. | 123/399 |
| 4,995,366 | 2/1991 | Manaka et al. | 123/492 |
| 5,050,083 | 9/1991 | Uchida et al. | 364/431.05 |
| 5,144,933 | 9/1992 | Nakaniwa | 123/675 |
| 5,179,923 | 1/1993 | Tsurutani et al. | 123/435 |

FOREIGN PATENT DOCUMENTS 58-8238 1/1983 Japan .

61-126337 6/1986 Japan .

OTHER PUBLICATIONS

#842040-Proceeding of the Scientific Lecture Meeting, 1984.

*Primary Examiner*—Thomas G. Black

*Assistant Examiner*—Jacques H. Louis-Jacques

*Attorney, Agent, or Firm*—Fay, Sharpe, Beall, Fagan, Minnich & McKee

[57] ABSTRACT

A learning control method for an electronic engine control system in which a variable concerning the adhesion of injected fuel onto a wall surface of an intake manifold, the evaporation of adhered fuel or the run-away of fuel to a cylinder is determined on the basis of a detection value of the operating state of an engine in accordance with a predetermined relational expression and the quantity of fuel injection is controlled on the basis of the determined value of the variable so that a target air/fuel ratio is realized, comprises the steps of determining the degree of deviation of an air/fuel ratio from the target value after the engine has been turned from a steady operating state into a transient operating state, determining a range in which the detection value of the engine operating state as the base of determination of the variable has changed upon occurrence of a fuel injection quantity control error which causes the deviation of the air/fuel ratio from the target value, and correcting a corresponding relationship between the engine operating state and the variable in the determined range of change on the basis of at least the degree of deviation of the air/fuel ratio from the target value by use of a rule-based inference.

22 Claims, 17 Drawing Sheets

LEARNING CONTROL METHOD FOR FUEL INJECTION CONTROL SYSTEM OF ENGINE

BACKGROUND OF THE INVENTION

The present invention relates to a method of automatically setting optimal model parameters in a fuel transport delay compensation method using a dynamic model.

The conventional methods of compensating for a delay in fuel transport by use of a dynamic model includes methods disclosed by Japanese Patent Application un-examined laid-open No. JP-A-58-8238 and U.S. Pat. No. 4,939,658. In these methods, the characteristics including the rate of adhesion, the rate of evaporation and the rate of parameters are beforehand formulated through predetermined experiments and the quantity of fuel injection is determined by use of those characteristics. For the formulation is used a method which is disclosed by, for example, Proceedings of the Scientific Lecture Meeting of Japan Automobile Technology Association, 842049. In the disclosed method, the formulation of characteristics is made by determining parameters so that a measured response of an air/fuel ratio of an exhaust gas, when the fuel injection quantity is stepwise changed in a state in which various conditions of an engine are constant, coincides with that response which is calculated using a fuel transport model.

The above prior art involves a problem that a desired control performance cannot be obtained even if the characteristics inclusive of the adhesion rate, the evaporation rate and the runaway rate determined by the predetermined experiments are set to a fuel control system as they are.

Also, in the above formulation method, it is not possible to uniquely determine the parameters since the measured response of the air/fuel ratio of the exhaust gas has a large variation even under the same engine operating condition. Therefore, a method may be considered in which the average values of parameter determined from several kinds of measured response is produced for use as a real parameter value for a certain operating condition. However, even by use of this method, there is a large possibility that the determined parameter includes an error. Therefore, even if the determined parameter is set to the control system as it is, a desired control performance cannot be obtained. Accordingly, the matching (or tuning) of a fuel system parameter becomes necessary.

Further, even if the parameter can be determined with satisfactory accuracy, there is the following problem concerning the detection of an air quantity. In order to obtain a desired performance of air/fuel ratio control, the quantity of air used for calculating the fuel injection quantity must be the quantity of air which flows into a cylinder. At present, an Hot Wire sensor or a pressure sensor is used for the detection of the air quantity. However, due to a delay in response of the sensor, the arrangement of the sensor, a processing for smoothing of pulsation or ripple, and so-on, it does not always follow that the detected air quantity coincides with the quantity of air which flows into the cylinder. This error in air quantity causes an air/fuel ratio control error. The matching of a fuel system parameter becomes necessary for making compensation for the air/fuel ratio control error.

As mentioned above, the matching of a fuel system parameter must be taken in order to obtain a desired control performance. In the existing circumstances, the matching is taken through the operation of an actual engine or an actual motor vehicle by a person. There is a problem that the matching must be taken in various operating ranges and hence a considerable number of steps are required for the development of a system.

Further, in the prior art, no consideration is made for a temporal change of the fuel transportation characteristic in an intake manifold. Accordingly, there is a possibility that the air/fuel ratio control performance is deteriorated with an increase in number of times of operation of an engine.

SUMMARY OF THE INVENTION

An object of the present invention is to provide a learning control method for engine in which the number of steps for system development can be reduced and the control performance is not deteriorated.

To attain the above object, the present invention provides the following methods.

Method I: A learning control method for an electronic engine control system in which a variable concerning the adhesion of injected fuel onto an inner wall surface of an intake manifold, the evaporation of adhered fuel or the runaway of adhered fuel to a cylinder is determined on the basis of a detection value of the operating state of an engine in accordance with a predetermined relational expression and the quantity of fuel injection is controlled on the basis of the determined value of the variable so that a target air/fuel ratio is realized, comprising the steps of:

(a) determining the degree of deviation of an air/fuel ratio from the target value after the engine has been turned from a steady operating state into a transient operating state;

(b) determining a range in which the detection value of the engine operating state as the base of determination of the variable has changed upon occurrence of a fuel injection quantity control error which causes the deviation of the air/fuel ratio from the target value; and (c) correcting a corresponding relationship between the engine operating state and the variable in the above range of change on the basis of at least the degree of deviation of the air/fuel ratio from the target value by use of a rule-based inference or reasoning.

Method 2: In the method 1, the degree of deviation of the air/fuel ratio from the target value is determined from the value of the air/fuel ratio of a mixture of exhaust gas which is detected by an air/fuel ratio sensor.

Method 3: In the method 1 or 2, an adhesion rate indicating the rate of adhesion of injected fuel onto the wall surface of the intake manifold and/or a runaway rate indicating the rate of runaway of adhered fuel to the cylinder in a unit time are determined as the variable concerning the adhesion of injected fuel onto the wall surface of the intake manifold, the evaporation of adhered fuel or the runaway of fuel to the cylinder, and a corresponding relationship between the adhesion rate and/or the runaway rate and the value of the engine operating state as the base of determination of the adhesion rate and the runaway rate is corrected by the rule-based inference.

Method 4: In the method 3, the rule-based inference uses the following rules (a) to (d):

(a) in the case where the air/fuel ratio in an accelerated state becomes larger than the target value, the value of the adhesion rate in the range of change in engine operating state upon occurrence of the control error is made large;

(b) in the case where the air/fuel ratio in the accelerated state becomes smaller than the target value, the value of the adhesion rate in the range of change in engine operating state upon occurrence of the control error is made small;

(c) in the case where the air/fuel ratio in a decelerated state becomes larger than the target value, the value of the adhesion rate in the range of change in engine operating state upon occurrence of the control error is made small; and (d) in the case where the air/fuel ratio in the decelerated state becomes smaller than the target value, the value of the adhesion rate in the range of change in engine operating state upon occurrence of the control error is made large.

Method 5: In the method 3, the rule-based inference uses the following rules (a) to (h):

(a) in the case where the air/fuel ratio in an accelerated state becomes larger than the target value, the value of the adhesion rate in the range of change in engine operating state upon occurrence of the control error is made large;

(b) in the case where the air/fuel ratio in the accelerated state becomes larger than the target value, the value of the runaway rate in the range of change in engine operating state upon occurrence of the control error is made small;

(c) in the case where the air/fuel ratio in the accelerated state becomes smaller than the target value, the value of the adhesion rate in the range of change in engine operating state upon occurrence of the control error is made small;

(d) in the case where the air/fuel ratio in the accelerated state becomes smaller than the target value, the value of the runaway rate in the range of change in engine operating state upon occurrence of the control error is made large;

(e) in the case where the air/fuel ratio in a decelerated state becomes larger than the target value, the value of the adhesion rate in the range of change in engine operating state upon occurrence of the control error is made small;

(f) in the case where the air/fuel ratio in the decelerated state becomes larger than the target value, the value of the runaway rate in the range of change in engine operating state upon occurrence of the control error is made large;

(g) in the case where the air/fuel ratio in the decelerated state becomes smaller than the target value, the value of the adhesion rate in the range of change in engine operating state upon occurrence of the control error is made large; and (h) in the case where the air/fuel ratio in the decelerated state becomes smaller than the target value, the value of the runaway rate in the range of change in engine operating state upon occurrence of the control error is made small.

Method 6: In the method 4 or 5, the degree of increase or decrease of the adhesion rate (and the runaway rate) is changed in accordance with the degree of deviation of the air/fuel ratio from the target value.

Method 7: In the method 4 or 5, both or one of a time $t_1$ in which an initial accelerated or decelerated state after transfer from the steady operating state to an accelerated or decelerated state is continued and a displacement $\Delta$ of the opening angle of a throttle, an air quantity or the internal pressure of the intake manifold in a range of that time $t_1$, are used as input information of the rule-based inference in addition to the degree of deviation of the air/fuel ratio from the target value, and the degree of correction of the adhesion rate (and the runaway rate) is changed in accordance with both or one of the time $t_1$ and the displacement $\Delta$.

Method 8: In the method 5, a time difference from the predetermined time in the acceleration or deceleration state until a predetermined time at which the air/fuel ratio deviates from the target value, is used as input information of the rule-based inference in addition to the degree of deviation of the air/fuel ratio from the target value, and the ratio of the correction of the adhesion rate to the correction of the runaway rate is changed in accordance with the time difference.

Method 9: In the methods 1 to 8, the rule-based inference uses a fuzzy inference or reasoning.

Method 10: A learning control method for an electronic engine control system in which a variable concerning the adhesion of injected fuel onto a wall surface of an intake manifold, the evaporation of adhered fuel or the runaway of adhered fuel to a cylinder is determined on the basis of a detection value of the operating state of an engine in accordance with a predetermined relational expression and the quantity of fuel injection is controlled on the basis of the determined value of the variable so that a target air/fuel ratio is realized, comprising the steps of:

(a) determining the degree of deviation of an air/fuel ratio from the target value after the engine has been turned from a steady operating state into a transient operating state;

(b) correcting and determining a correction factor for the variable concerning the adhesion of injected fuel onto the wall surface of the intake manifold, the evaporation of adhered fuel or the runaway of fuel to the cylinder on the basis of at least the degree of deviation of the air/fuel ratio from the target value by use of a rule-based inference;

(c) correcting the variable concerning the adhesion of injected fuel onto the wall of the intake manifold, the evaporation of fuel or the runaway of fuel to the cylinder by the correction factor; and (d) making a fuel control on the basis of the corrected variable.

Method 11: In the method 10, the degree of deviation of the air/fuel ratio from the target value is determined on the basis of the maximum or minimum in predetermined period of a correction factor for a fuel injection time (or a feedback correction coefficient) corrected and updated on the basis of the output of an oxygen sensor.

Method 12: In the method 10 or 11, an adhesion rate indicating the rate of adhesion of injected fuel onto the wall surface of the intake manifold and/or a runaway rate indicating the rate of runaway of adhered fuel to the cylinder in a unit time are determined as the variable concerning the adhesion of injected fuel onto the wall surface of the intake manifold, the evaporation of adhered fuel or the runaway of fuel to the cylinder, and correction factors for the adhesion rate and/or the runaway rate are determined by use of the rule-based inference.

Method 13: In the method 12, the correction factor is corrected using the following processes (a) to (d):

(a) in the case where the air/fuel ratio in an accelerated state becomes larger than the target value, the correction factor for the adhesion rate is corrected by use of the rule-based inference so that the value of the adhesion rate in the same engine operating state becomes large;

(b) in the case where the air/fuel ratio in the accelerated state becomes smaller than the target value, the correction factor for the adhesion rate is corrected by use of the rule-based inference so that the value of the adhesion rate in the same engine operating state becomes small;

(c) in the case where the air/fuel ratio in a decelerated state becomes larger than the target value, the correction factor for the adhesion rate is corrected by use of the rule-based inference so that the value of the adhesion rate in the same engine operating state becomes small; and (d) in the case where the air/fuel ratio in the decelerated state becomes smaller than the target value, the correction factor for the adhesion rate is corrected by use of the rule-based inference so that the value of the adhesion rate in the same engine operating state becomes large.

Method 14: In the method 12, the correction factors are corrected using the following processes (a) to (h):

(a) in the case where the air/fuel ratio in an accelerated state becomes larger than the target value, the correction factor for the adhesion rate is corrected by use of the rule-based inference so that the value of the adhesion rate in the same engine operating stage becomes large;

(b) in the case where the air/fuel ratio in the accelerated state becomes larger than the target value, the correction factor for the runaway rate is corrected by use of the rule-based inference so that the value of the runaway rate in the same engine operating state becomes small;

(c) in the case where the air/fuel ratio in the accelerated state becomes smaller than the target value, the correction factor for the adhesion rate is corrected by use of the rule-based inference so that the value of the adhesion rate in the same engine operating state becomes small;

(d) in the case where the air/fuel ratio in the accelerated state becomes smaller than the target value, the correction factor for the runaway rate is corrected by use of the rule-based inference so that the value of the runaway rate in the same engine operating state becomes large;

(e) in the case where the air/fuel ratio in a decelerated state becomes larger than the target value, the correction factor for the adhesion rate is corrected by use of the rule-based inference so that the value of the adhesion rate in the same engine operating state becomes small;

(f) in the case where the air/fuel ratio in the decelerated state becomes larger than the target value, the correction factor for the runaway rate is corrected by use of the rule-based inference so that the value of the runaway rate in the same engine operating stage becomes large;

(g) in the case where the air/fuel ratio in the decelerated state becomes smaller than the target value, the correction factor for the adhesion rate is corrected by use of the rule-based inference so that the value of the adhesion rate in the same engine operating state becomes large; and (h) in the case where the air/fuel ratio in the decelerated state becomes smaller than the target value, the correction factor for the runaway rate is corrected by use of the rule-based inference so that the value of the runaway rate in the same engine operating state becomes small.

Method 15: In the method 13 or 14, the degree of correction of the correction factors for the adhesion rate and/or the runaway rate is changed in accordance with the degree of deviation of the air/fuel ratio from the target value.

Method 16: In the method 13 or 14, both or one of a time $t_1$ in which an initial accelerated or decelerated state after transfer from the steady operating state to an accelerated or decelerated state is continued and a displacement Δ of the opening angle of a throttle, an air quantity or the internal pressure of the intake manifold in a range of that time $t_1$, are used as input information of the rule-based inference in addition to the degree of deviation of the air/fuel ratio from the target value, and the degree of correction of the correction factors for the adhesion rate and/or the runaway rate is changed in accordance with both or one of the time $t_1$ and the displacement Δ.

Method 17: In the method 14, a time difference from the predetermined time in the acceleration or deceleration state until a predetermined time at which the air/fuel ratio deviates from the target value, is used as input information of the rule-based inference in addition to the degree of deviation of the air/fuel ratio from the target value, and the ratio of the correction of the correction factor for the adhesion rate to the correction of the correction factor for the runaway rate is changed in accordance with the time difference.

Method 18: In the methods 10 to 17, the rule-based inference uses a fuzzy inference.

According to the method 1, if a rule is made on the basis of a knowledge concerning a parameter matching or tuning obtained from the analysis of the characteristic of a control system and/or the running or operating test of actual vehicles, parameters concerning the adhesion of fuel, the evaporation of fuel, and so on can be corrected automatically by a rule-based inference using this rule so that an air/fuel ratio coincides with a target value. Therefore, the initialization of parameters may be rough, which makes it possible to reduce the number of steps for development of a fuel control system. Also, even if a fuel transport characteristic in the intake manifold has a temporal change so that the states of adhesion and evaporation of fuel in the intake manifold change, there is no deterioration of an air/fuel ratio control performance since the parameters concerning the adhesion of fuel, the evaporation of fuel and so on can be corrected automatically so as to obtain the optimum state (or a state in which the target air/fuel ratio is realized).

According to the method 2, the deviation of the air/fuel ratio from the target value can be detected with satisfactory accuracy by using the air/fuel sensor.

According to the method 3, the derivation of a learning correction rule becomes easy by causing two parameters of the rate of adhesion of injected fuel and the rate of runaway of adhered fuel to represent a fuel transport state in the intake manifold.

The operation of the method 4 is as follows. In the JP-A-59-248127 mentioned earlier, the fuel control is made by use of the following mathematical model representing the fuel flow in the intake manifold:

$$G_{fe} = (1 - X)G_f + \frac{1}{\tau} M_f \quad (1)$$

$$\frac{dM_f}{dt} = -\frac{1}{\tau} M_f + X \cdot G_f \quad (2)$$

where $G_{fe}$ is the quantity (g/s) of inflow of fuel into the cylinder, $G_f$ the quantity (g/s) of injection of fuel, $M_f$ the quantity (g) of a liquid film, X the rate of adhesion ($0 \leqq X \leqq 1$), and $1/\tau$ the rate (1/s) of evaporation.

The equations (1) and (2) give a mathematically modeled representation of the flow of fuel shown in FIG. 24. Namely, the equation (1) shows that the total quantity of inflow of fuel into the cylinder is a sum of a portion of injected fuel which does not adhere onto the wall surface of the intake manifold and fuel which evaporates from the liquid film. Also, the equation (2) shows that a change of the liquid film quantity in one unit time is a difference between the quantity of fuel which adhere onto the wall surface of the intake manifold in one unit time and the quantity of fuel which evaporates from the liquid film in one unit time.

In a multi-point fuel injection system, there may also be fuel which flows from a liquid film into a cylinder in a liquid state as it is. Taking this phenomenon into consideration, we introduce the following mathematical model as a more general model of fuel transport:

$$G_{fe} = (1 - X)G_f + \alpha \cdot M_f \quad (3)$$

$$\frac{dM_f}{dt} = -\alpha \cdot M_f + X \cdot G_f \quad (4)$$

where $\alpha$ is a variable indicating a rate at which the liquid film runs away with itself to the cylinder in one unit time. This variable $\alpha$ corresponds to the rate of evaporation $1/\tau$ shown in the equations (1) and (2). Thereinafter, the variable $\alpha$ will be referred to as a runaway rate. The quantity $\alpha M_f$ represents the quantity of runaway of fuel from the liquid film to the cylinder in one unit time and includes not only the quantity of fuel which evaporates from the liquid film and then flows into the cylinder but also the quantity of fuel which flows from the liquid film into the cylinder in a liquid state as it is.

Making Laplace transformation of the equations (3) and (4) and eliminating $M_f$, we obtain the following equation concerning $G_f$ and $G_{fe}$:

$$G_f = \frac{1 + \frac{1}{\alpha} \cdot S}{1 + \frac{1 - X}{\alpha} \cdot S} \cdot G_{fe} \quad (5)$$

where S is a Laplacean.

Provided that the quantity of intake air is $Q_a$ and a target air/fuel ratio is A/F, the target air/fuel ratio can be realized by determining the value of fuel injection quantity $G_f$ so that $G_{fe}$ becomes equal to $Q_a/(A/F)$. This value of fuel injection quantity $G_f$ is determined by the following equation:

$$G_f = \frac{1 + \frac{1}{\alpha} \cdot S}{1 + \frac{1 - X}{\alpha} \cdot S} \cdot \frac{Q_a}{A/F} \quad (6)$$

$G_f$ is determined by making a phase advance compensation for a variable $Q_a/(A/F)$. When the runaway rate $\alpha$ is fixed, the value of a time constant $(1-X)/\alpha$ of a denominator in the equation (6) becomes smaller as the adhesion rate X is larger. Accordingly, the degree of phase advance becomes larger, resulting in the injection of a more quantity of fuel in the case of an accelerated state and the injection of a less quantity of fuel in the case of a decelerated state.

From the same logic as that in the JP-A-59-248127, the representation of the fuel injection quantity of equation (6) in a time domain is given by the following equation:

$$G_f = \frac{\frac{Q_a}{A/F} - \alpha \cdot M_f}{1 - X} \quad (7)$$

From the above consideration, it is apparent that when a fuel control is made on the basis of the equation (7), the deviation of an air/fuel ratio from the target value can be made small by making the value of the adhesion rate small to decrease (or increase) the fuel injection quantity in the case where the air/fuel ratio in the accelerated state becomes smaller than the target value (or in the case where the air/fuel ratio in the decelerated state becomes larger than the target value). Also, in the case where the air/fuel ratio in the accelerated state becomes larger than the target value (or in the case where the air/fuel ratio in the decelerated state becomes smaller than the target value), it is possible to allow the air/fuel ratio to come near the target value by making the value of the adhesion rate large to increase (or decrease) the fuel injection quantity.

Next, the operation of the method 5 will be explained. In the case where a mismatching between the runaway rate set for the control system and the actual runaway rate is large, it is difficult to obtain a desired air/fuel ratio in various operating ranges by only the correction of the adhesion rate. In this case, it becomes necessary to simultaneously correct the adhesion rate and the runaway rate.

A guide line for the simultaneous correction of the adhesion rate and the runaway rate is as follows. According to the equation (6), if the runaway rate is made small, a time constant of the numerator and a time constant of the denominator become both large. In order to increase the fuel injection quantity in the accelerated state, the time constant of the denominator must be prevented from being increased. This can be attained by making the value of the adhesion rate large. More particularly, provided that an adhesion rate and a runaway rate at the present point of time are $X_{old}$ and $\alpha_{old}$ and the runaway rate is corrected to $\alpha_{new}$, a new adhesion rate $X_{new}$ is determined to take a value which satisfies the following equation:

$$\frac{1 - X_{old}}{\alpha_{old}} \geqq \frac{1 - X_{new}}{\alpha_{new}} \quad (8)$$

Thus, a guideline for the correction of parameters when the adhesion rate and the runaway rate are to be simultaneously corrected is as follows.

Increase of Fuel Injection Quantity in Accelerated State: X and $\alpha$ are made large and small, respectively, with $(1-X_{old})/\alpha_{old} \geqq (1-X_{new})/\alpha_{new}$ being satisfied, where $X_{old}$ and $\alpha_{old}$ are parameters before correction and $X_{new}$ and $\alpha_{new}$ are parameters after correction.

Decrease of Fuel Injection Quantity in Accelerated State: X and $\alpha$ are made small and large, respectively, with $(1-X_{old})/\alpha_{old} \leqq (1-X_{new})/\alpha_{new}$ being satisfied, where $X_{old}$ and $\alpha_{old}$ are parameters before correction and $X_{new}$ and $\alpha_{new}$ are parameters after correction.

Increase of Fuel Injection Quantity in Decelerated State: X and $\alpha$ are made small and large, respectively, with $(1-X_{old})/\alpha_{old} \leqq (1-X_{new})/\alpha_{new}$ being satisfied, where $X_{old}$ and $\alpha_{old}$ are parameters before correction and $X_{new}$ and $\alpha_{new}$ are parameters after correction.

Decrease of Fuel Injection Quantity in Decelerated State: X and $\alpha$ are made large and small, respectively, with $(1-X_{old})/\alpha_{old} \geqq (1-X_{new})/\alpha_{new}$ being satisfied, where $X_{old}$ and $\alpha_{old}$ are parameters before correction and $X_{new}$ and $\alpha_{new}$ are parameters after correction.

Accordingly, in the method 5, in the case where the air/fuel ratio in the accelerated state becomes smaller than the target value, the fuel injection quantity is decreased by making the value of the adhesion rate small and the value of the runaway rate large, thereby making it possible to make the deviation of the air/fuel ratio from the target value small. On the other hand, in the case where the air/fuel ratio in the accelerated state becomes larger than the target value, the fuel injection quantity is increased by making the value of the adhesion rate large and the value of the runaway rate small, thereby making it possible to make the deviation of the air/fuel ratio from the target value small. In the case of the decelerated state too, a similar effect is obtained.

Next, the operation of the method 6 will be explained. In the same accelerated or decelerated state, a larger increase or decrease of the fuel injection quantity is required as the degree of deviation of the air/fuel ratio from the target value becomes larger. Accordingly, in order to realize the target air/fuel ratio, it is necessary to change the degree of increase or decrease of the fuel injection quantity, namely the degree of parameter correction in accordance with the degree of deviation of the air/fuel ratio from the target value. In the method 6, the degrees of correction of the adhesion rate and the runaway rate are changed in accordance with the degree of deviation of the air/fuel ratio from the target value, thereby determining more proper amounts of correction of the adhesion rate and the runaway rate. Thereby, it is possible to reduce the number of times of parameter correction necessary for converging the adhesion rate and the runaway rate to the optimum values.

Next, the operation of the method 7 will be explained, even if the degree of deviation of the air/fuel ratio from the target value, when the acceleration or deceleration is made, is the same, the degree of a mismatching in parameter may be different if the speed and/or time of acceleration or deceleration are different. Accordingly, if the degree of acceleration or deceleration is not taken into consideration, it is not possible to determine a proper amount of parameter correction. In the method 7, the state (speed and/or time) of acceleration or deceleration is judged by use of a time in which an initial accelerated or decelerated state upon transfer from a steady operating state to an accelerated or decelerated state is continued or a displacement of the opening angle of a throttle, an air quantity or the internal pressure of the intake manifold in a range of that time to determine proper amounts of correction of the adhesion rate and the runaway rate in accordance with the state of acceleration or deceleration. An effect similar to that in the method 6 is obtained.

The operation of the method 8 is as follows. In general, When a mismatching between the runaway rate set for the control system and the actual runaway rate is large, there takes place a phenomenon that the air/fuel ratio inclines to a lean or rich side for a long time. In order to suppress this phenomenon, it becomes necessary to make the amount of correction of the runaway rate larger than that of the adhesion rate. In the method 8, the allocation of correction to the adhesion rate and the runaway rate is changed in accordance with that phenomenon, thereby determining proper amounts of parameter correction conformable to the situation.

The adjustment of parameters is made by persons on the basis of an ambiguous rule. Thus, to describe the adjustment rule of parameters by a fuzzy rule is considered to be effective. From this reason, in the method 9, a fuzzy inference is used as the rule-based inference.

The operations of the methods 10 and 12 to 18 are basically the same as those of the methods 1 and 3 to 9, respectively. In the method 11, an oxygen sensor is used in lieu of the air/fuel sensor in order to determine the deviation of the air/fuel ratio from the target value in a simpler way. Thereby, a reduction in cost becomes possible.

DESCRIPTION OF THE PREFERRED EMBODIMENTS

In the following, more specified embodiments of the present invention will be explained by virtue of FIGS. 1 to 23.

Figure 1:
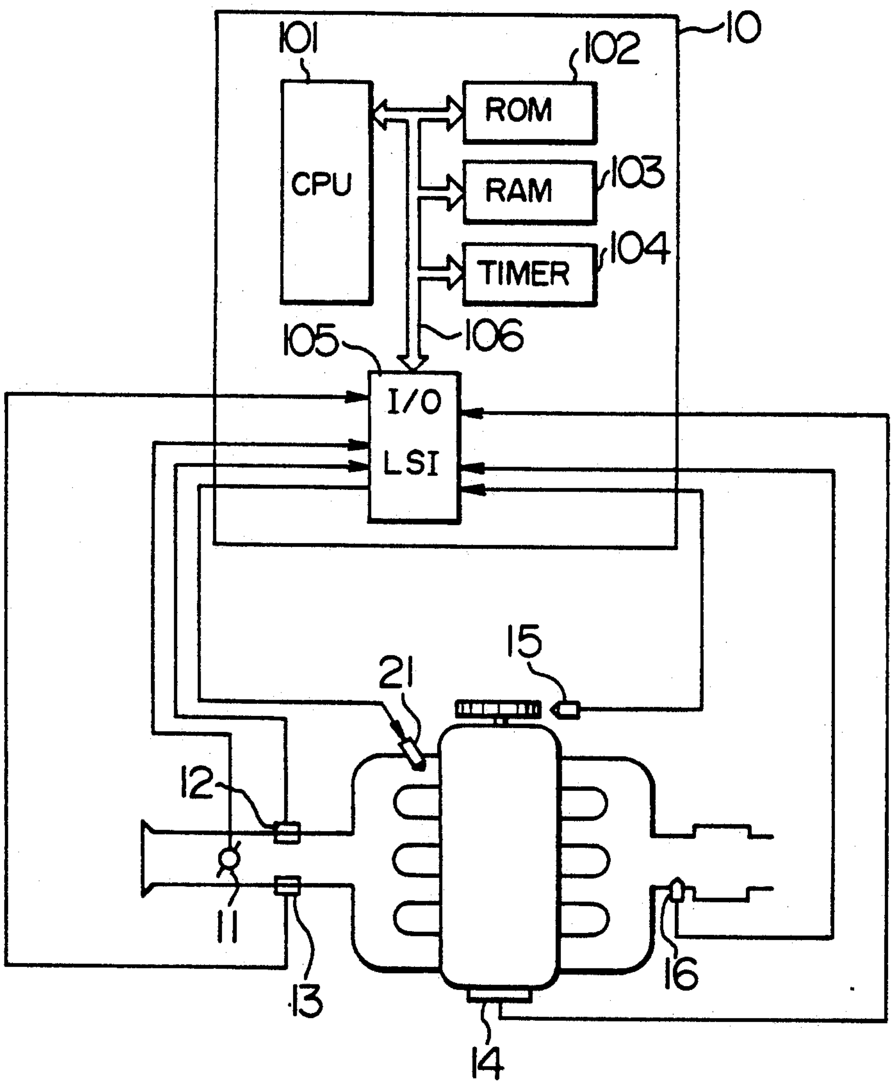
FIG. 1 is a diagram showing the construction of the whole of an engine fuel injection control system to which a method of the present invention is applied.

First, explanation will be made of a fuel control system which is the object of application of a parameter matching system of the present invention. FIG. 1 is a diagram showing the construction of the whole of the fuel control system. A control unit 10 includes a CPU 101, a ROM 102, a RAM 103, a timer 104, an I/O LSI circuit 105 and a bus 106 for electrically connecting those components. Detection information from a throttle angle sensor 11, a pressure sensor 12, an intake air temperature sensor 13, a water temperature sensor 14, a crank angle sensor 15 and an oxygen sensor 16 is taken into the RAM 103 through the I/O LSI circuit 105. A fuel injection valve driving signal to an injector 21 is outputted from the I/O LSI circuit 105. This drawing shows only one injecter for simplification.

Figure 2:
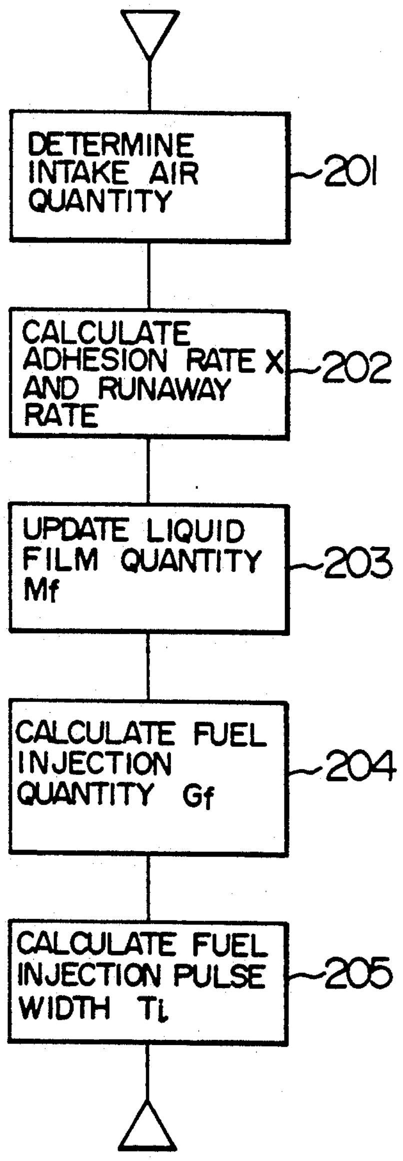
FIG. 2 is a flow chart of a fuel control program.

A control of the fuel injection quantity is made by a control program stored in the ROM 102. A flow chart of the control program is shown in FIG. 2. This program is activated or executed at a period of 10 msec.

First, in step 201, an intake air quantity $Q_a$ is determined by searching a predetermined table with the internal pressure $P_m$ of an intake manifold and an engine rotation speed N being taken as parameters.

Next, in step 202, the rate X of adhesion of fuel and the rate $\alpha$ of runaway of fuel are determined from the internal pressure $P_m$ of the intake manifold, the engine rotation speed N and a water temperature $T_w$ in accordance with the following equations:

$$X=f(P_m, N, T_w) \quad \ldots (9)$$

$$\alpha=g(P_m, N, T_w) \quad \ldots (10)$$

where f and g are predetermined operators.

Next, in step 203, the quantity $M_f$ of liquid film is updated, from the adhesion rate X and the runaway rate $\alpha$ calculated in step 202 and the latest execution value $G_{fo}$ of a fuel injection quantity $G_f$ calculated in step 204 mentioned later on, in accordance with the following equation:

$$M_f(i+1)=(1-\Delta t\cdot\alpha)\cdot M_f(i)+X\cdot\Delta t\cdot G_{fo} \quad \ldots (11)$$

where i represents a time (one time is equal to a time period of $\Delta t$) and $\Delta t$ is the period of estimation of the liquid film quantity (10 msec). Equation (11) can be derived by differentiation.

Next, in step 204, the fuel injection quantity $G_f$ is calculated in accordance with the equation (7) from a target air/fuel ratio A/F (14.7) and the intake air quantity $Q_a$, the adhesion rate X, the runaway rate $\alpha$ and the liquid film quantity $M_f$ calculated in the above steps.

Finally, in step 205, a fuel injection pulse width $T_i$ is calculated from the fuel injection quantity $G_f$ calculated in step 204 in accordance with the following equation:

$$T_i = K \cdot \frac{\gamma \cdot G_f}{N} + T_s \quad (12)$$

where K is a various correction coefficient, $\gamma$ a feedback correction coefficient, N the engine speed and $T_s$ an invalid injection time.

With the above steps, the processing is completed. For a fuel injection command, the fuel injection valve of each cylinder is driven by a driving pulse with the latest operated or calculated pulse width $T_i$ to effect fuel injection.

Next, explanation will be made of a learning control system for fuel system parameters in which the performance of control can be maintained with an adaptability to a temporal change of the engine. In this system, correction factors for the adhesion rate and the runaway rate are determined on the basis of an output of the oxygen sensor to correct the values of parameters in directions in which the target air/fuel ratio is realized. The calculation of the correction factors is performed in accordance with a control program stored in the ROM 102 shown in FIG. 1. Herein, the adhesion rate and the runaway rate are calculated on the basis of the following equations (in lieu of the equations (9) and (10)):

$$X=f(P_m, N, T_w)+\gamma_1 \quad \ldots (13)$$

$$\alpha=g(P_m, N, T_w)+\gamma_2 \quad \ldots (14)$$

where $\gamma_1$ and $\gamma_2$ are learning correction factors and f and g are parameter characteristics prematched so that the target air/fuel ratio is realized. The initial values of the learning correction factors are zero.

Figure 3:
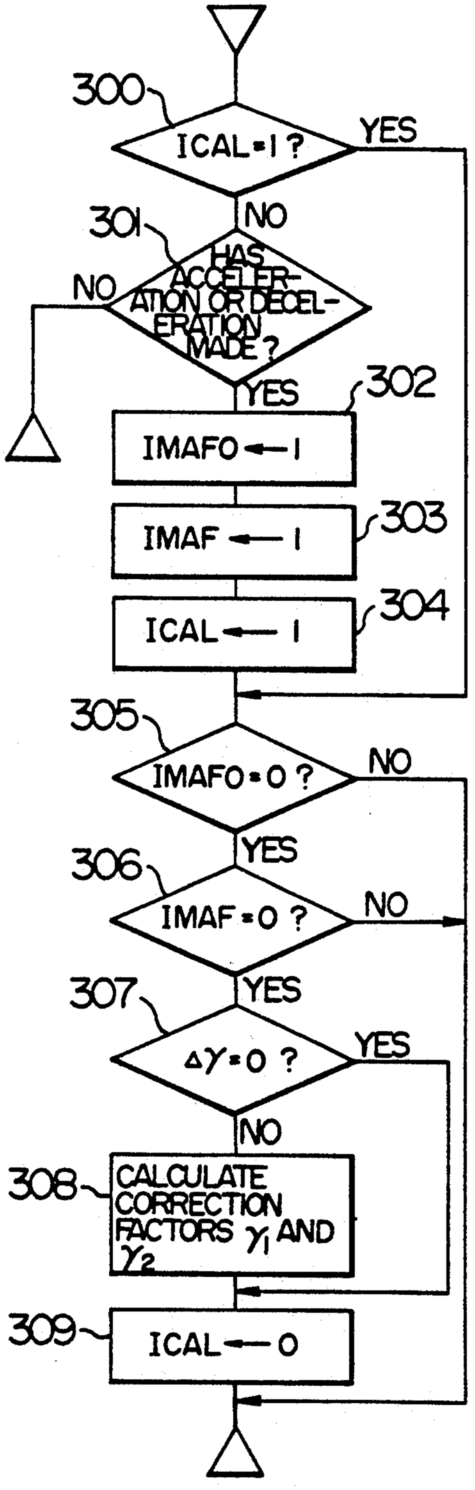
FIG. 3 is a flow chart of a parameter learning program.
Figure 4:
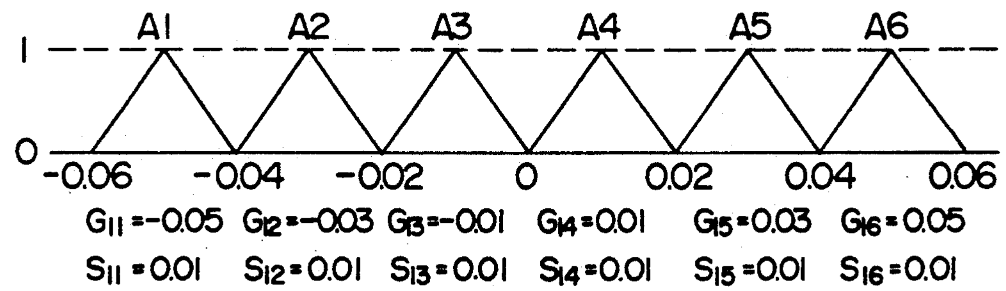
FIG. 4 shows membership functions for correction of the rate of adhesion.
Figure 5:
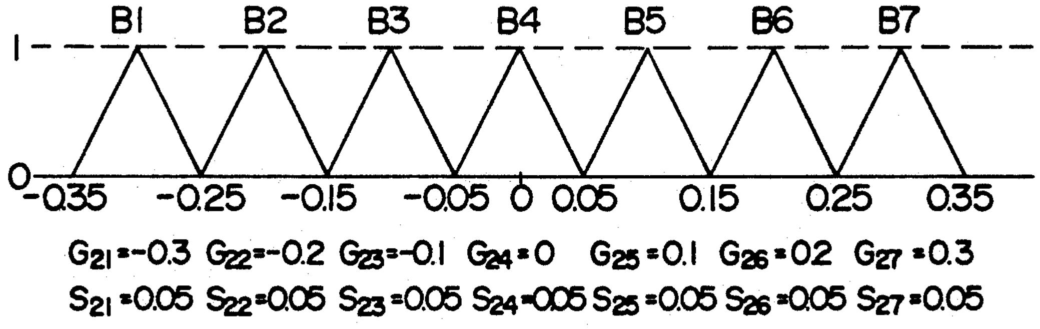
FIG. 5 shows membership functions for correction of the rate of runaway.
Figure 6:
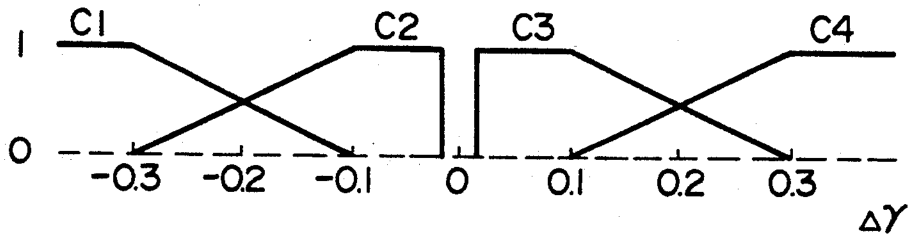
FIG. 6 shows membership functions concerning the degree of leanness or richness of an air/fuel ratio.
Figure 7:
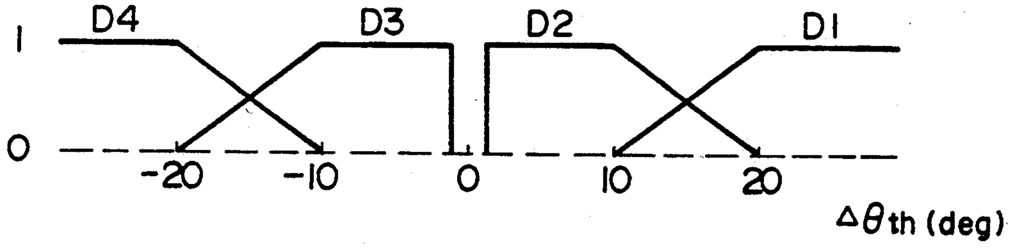
FIG. 7 shows membership functions concerning a displacement of the opening angle of a throttle.
Figure 8:
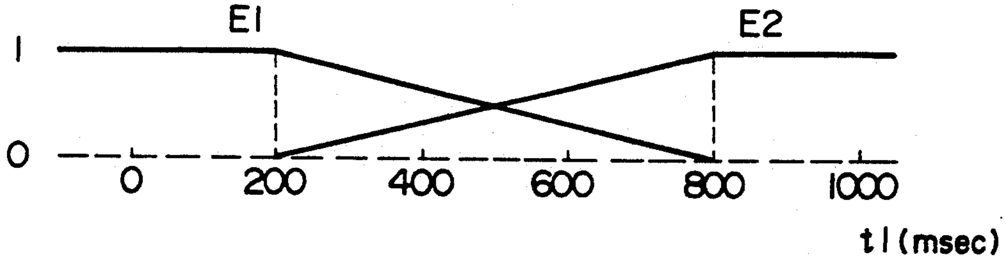
FIG. 8 shows membership functions concerning a time in which an engine is in an initial accelerated or decelerated state.
Figure 9:
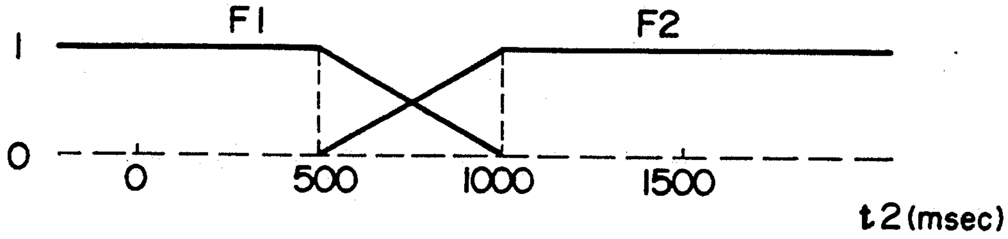
FIG. 9 shows membership functions concerning a time difference from the time of completion of the acceleration or deceleration until a predetermined time at which the air/fuel ratio deviates from a target value.

FIG. 3 shows a flow chart of a parameter learning program. In this program, the learning correction factors are determined on the basis of a predetermined processing. First, in step 300, the judgement is made as to whether or not a flag ICAL indicating the completion/incompletion of subsequent processes up to step 304 is "1". The flow proceeds to step 305 if the flag is "1" and to step 301 if the flag is not "1". In step 301, the judgement is made as to whether or not the operating state of the engine has been transferred from a steady state to an accelerated or decelerated state. Herein, the following judgement condition can be used.

Namely, if the following equations (15), (16), (17), (18) and (19) are satisfied, the entry of the engine into the accelerated state at the present time i is determined. If the following equations (15), (16), (17), (18) and (20) are satisfied, the entry of the engine into the decelerated state at the present time i is determined.

$$|\theta_{th}(i-2)-\theta_{th}(i-4)| < K_1 \quad \ldots (15)$$

$$|\theta_{th}(i-1)-\theta_{th}(i-3)| < K_1 \quad \ldots (16)$$

$$|M_f(i-2)-M_f(i-4)| < K_2 \quad \ldots (17)$$

$$|M_f(i-1)-M_f(i-3)| < K_2 \quad \ldots (18)$$

$$\theta_{th}(i)-\theta_{th}(i-2) > K_3 \quad \ldots (19)$$

$$\theta_{th}(i)-\theta_{th}(i-2) < -K_3 \quad \ldots (20)$$

where $\theta_{th}$ is the throttle opening angle, $M_f$ the liquid film quantity, i a time (one time is equal to 10 msec), and $K_i$ (i=1, 2, 3) a positive constant.

Further, when the judgement of the entry into the accelerated state is made, an acceleration/deceleration judgement flag IFRG is set to "0". When the judgement of the entry into the decelerated state is made, the flag IFRG is set to "1".

In the case where the judgement of the entry from the steady state into the accelerated or decelerated state is made, the flow goes to the succeeding process. If the case is not so, the processing is completed.

In step 302, "1" is set into a flag IMAFO for commanding the determination of a time $t_1$ in which the engine is in the initial accelerated or decelerated state and a displacement $\Delta\theta_{th}$ of the throttle opening angle in that time. The calculation of the two variables is performed in accordance with another program. The operation of this program will be mentioned later on.

Next, in step 303, "1" is set into a flag IMAF for commanding the determination of the degree $\Delta\gamma$ of leanness or richness of an air/fuel ratio in the accelerated or decelerated state and a time difference $t_2$ from the time of completion of the accelerated or decelerated state until a predetermined time at which the air/fuel ratio deviates from the target value. The calculation of the two variables is performed in accordance with another program. The operation of this program will be mentioned later on. Next, in step 304, the flag ICAL is set to "1".

Next, in step 305, the judgement as to whether or not the calculation of $t_1$ and $\Delta\theta_{th}$ mentioned above has been completed, is made referring to the flag IMAFO. If the flag IMAFO is "0", it is indicated that the calculation has been completed. If the flag IMAFO is "1", it is indicated that the calculation is being performed. In the case where the flag IMAFO is "0", the flow proceeds to the next process of step 306. In the case where the flag IMAFO is "1", the processing is completed.

In step 306, the judgement as to whether or not the calculation of $\Delta\gamma$ and $t_2$ mentioned above has been completed, is made by means of the flag IMAF. If the flag IMAF is "0", it is indicated that the calculation has been completed. If the flag IMAF is "1", it is indicated that the calculation is being performed. In the case where the value of the flag IMAF is "0", the flow proceeds to the next process of step 307. In the case where the value of the flag IMAF is "1", the processing is completed.

In step 307, the judgement is made as to whether or not the calculated degree $\Delta\gamma$ of leanness or richness is 0. If $\Delta\gamma$ is 0, the flow goes to step 309. This means that there is no need of parameter correction since a desired air/fuel control parameter has been attained in the accelerated or decelerated state.

In step 308, the values of the learning correction coefficients $\gamma_1$ and $\gamma_2$ are corrected by use of a fuzzy inference. Rules shown in the following tables I to IV are used as fuzzy rules.

TABLE I

| Rule | State of Accel./Decel. | State of Air/Fuel Ratio | $\|\Delta\theta_{th}\|$ | $t_1$ | $\|\Delta\gamma\|$ | $t_2$ | $\Delta\gamma_1$ | $\Delta\gamma_2$ |
|---|---|---|---|---|---|---|---|---|
| 1 | Accel. | Rich | B | B | B | B | NM | PM |
| 2 | Accel. | Rich | B | B | B | S | NM | ZO |
| 3 | Accel. | Rich | B | S | B | B | NM | PM |
| 4 | Accel. | Rich | B | S | B | S | NM | ZO |

TABLE I-continued

| Rule | State of Accel./Decel. | State of Air/Fuel Ratio | $\|\Delta\theta_{th}\|$ | $t_1$ | $\|\Delta\gamma\|$ | $t_2$ | $\Delta\gamma_1$ | $\Delta\gamma_2$ |
|---|---|---|---|---|---|---|---|---|
| 5 | Accel. | Rich | S | B | B | B | NB | PB |
| 6 | Accel. | Rich | S | B | B | S | NB | ZO |
| 7 | Accel. | Rich | S | S | B | B | NM | PM |
| 8 | Accel. | Rich | S | S | B | S | NM | ZO |
| 9 | Accel. | Rich | B | B | S | B | NS | PS |
| 10 | Accel. | Rich | B | B | S | S | NS | ZO |
| 11 | Accel. | Rich | B | S | S | B | NS | PS |
| 12 | Accel. | Rich | B | S | S | S | NS | ZO |
| 13 | Accel. | Rich | S | B | S | B | NM | PM |
| 14 | Accel. | Rich | S | B | S | S | NM | ZO |
| 15 | Accel. | Rich | S | S | S | B | NS | PS |
| 16 | Accel. | Rich | S | S | S | S | NS | ZO |

TABLE II

| Rule | State of Accel./Decel. | State of Air/Fuel Ratio | $\|\Delta\theta_{th}\|$ | $t_1$ | $\|\Delta\gamma\|$ | $t_2$ | $\Delta\gamma_1$ | $\Delta\gamma_2$ |
|---|---|---|---|---|---|---|---|---|
| 17 | Accel. | Lean | B | B | B | B | PM | NM |
| 18 | Accel. | Lean | B | B | B | S | PM | ZO |
| 19 | Accel. | Lean | B | S | B | B | PM | NM |
| 20 | Accel. | Lean | B | S | B | S | PM | ZO |
| 21 | Accel. | Lean | S | B | B | B | PB | NB |
| 22 | Accel. | Lean | S | B | B | S | PB | ZO |
| 23 | Accel. | Lean | S | S | B | B | PM | NM |
| 24 | Accel. | Lean | S | S | B | S | PM | ZO |
| 25 | Accel. | Lean | B | B | S | B | PS | NS |
| 26 | Accel. | Lean | B | B | S | S | PS | ZO |
| 27 | Accel. | Lean | B | S | S | B | PS | NS |
| 28 | Accel. | Lean | B | S | S | S | PS | ZO |
| 29 | Accel. | Lean | S | B | S | B | PM | NM |
| 30 | Accel. | Lean | S | B | S | S | PM | ZO |
| 31 | Accel. | Lean | S | S | S | B | PS | NS |
| 32 | Accel. | Lean | S | S | S | S | PS | ZO |

TABLE III

| Rule | State of Accel./Decel. | State of Air/Fuel Ratio | $\|\Delta\theta_{th}\|$ | $t_1$ | $\|\Delta\gamma\|$ | $t_2$ | $\Delta\gamma_1$ | $\Delta\gamma_2$ |
|---|---|---|---|---|---|---|---|---|
| 33 | Decel. | Rich | B | B | B | B | PM | NM |
| 34 | Decel. | Rich | B | B | B | S | PM | ZO |
| 35 | Decel. | Rich | B | S | B | B | PM | NM |
| 36 | Decel. | Rich | B | S | B | S | PM | ZO |
| 37 | Decel. | Rich | S | B | B | B | PB | NB |
| 38 | Decel. | Rich | S | B | B | S | PB | ZO |
| 39 | Decel. | Rich | S | S | B | B | PM | NM |
| 40 | Decel. | Rich | S | S | B | S | PM | ZO |
| 41 | Decel. | Rich | B | B | S | B | PS | NS |
| 42 | Decel. | Rich | B | B | S | S | PS | ZO |
| 43 | Decel. | Rich | B | S | S | B | PS | NS |
| 44 | Decel. | Rich | B | S | S | S | PS | ZO |
| 45 | Decel. | Rich | S | B | S | B | PM | NM |
| 46 | Decel. | Rich | S | B | S | S | PM | ZO |
| 47 | Decel. | Rich | S | S | S | B | PS | NS |
| 48 | Decel. | Rich | S | S | S | S | PS | ZO |

TABLE IV

| Rule | State of Accel./Decel. | State of Air/Fuel Ratio | $\|\Delta\theta_{th}\|$ | $t_1$ | $\|\Delta\gamma\|$ | $t_2$ | $\Delta\gamma_1$ | $\Delta\gamma_2$ |
|---|---|---|---|---|---|---|---|---|
| 49 | Decel. | Lean | B | B | B | B | NM | PM |
| 50 | Decel. | Lean | B | B | B | S | NM | ZO |
| 51 | Decel. | Lean | B | S | B | B | NM | PM |
| 52 | Decel. | Lean | B | S | B | S | NM | ZO |
| 53 | Decel. | Lean | S | B | B | B | NB | PB |
| 54 | Decel. | Lean | S | B | B | S | NB | ZO |
| 55 | Decel. | Lean | S | S | B | B | NM | PM |
| 56 | Decel. | Lean | S | S | B | S | NM | ZO |
| 57 | Decel. | Lean | B | B | S | B | NS | PS |
| 58 | Decel. | Lean | B | B | S | S | NS | ZO |
| 59 | Decel. | Lean | B | S | S | B | NS | PS |
| 60 | Decel. | Lean | B | S | S | S | NS | ZO |

TABLE IV-continued

| Rule | State of Accel./Decel. | State of Air/Fuel Ratio | $\lvert\Delta\theta_{th}\rvert$ | $t_1$ | $\lvert\Delta\gamma\rvert$ | $t_2$ | $\Delta\gamma_1$ | $\Delta\gamma_2$ |
|---|---|---|---|---|---|---|---|---|
| 61 | Decel. | Lean | S | B | S | B | NM | PM |
| 62 | Decel. | Lean | S | B | S | S | NM | ZO |
| 63 | Decel. | Lean | S | S | S | B | NS | PS |
| 64 | Decel. | Lean | S | S | S | S | NS | ZO |

In the tables, $|\Delta\theta_{th}|$ represents the absolute value of a displacement of the throttle opening angle, $|\Delta\gamma|$ the degree of deviation of the air/fuel ratio from the target value (lean if $\Delta\gamma>0$ and rich if $\Delta\gamma<0$), $t_1$ a time in which the engine is in the initial accelerated or decelerated state, $t_2$ a time difference from the time of completion of the accelerated or decelerated state until a predetermined time at which the air/fuel ratio deviates from the target value, $\Delta\gamma_1$ the amount of change of the learning correction factor $\gamma_1$, and $\Delta\gamma_2$ the amount of change of the learning correction factor $\gamma_2$. Also, B =big, S=small, NB=negative big, NM=negative medium, NS=negative small, ZO=zero, PS=positive small, PM=positive medium, and PM=positive big. For example, the rule 1 means that "if the air/fuel ratio becomes rich in the accelerated state and the absolute value $|\Delta\theta_{th}|$ of the displacement of the throttle opening angle is big and the value of the time $t_1$ in which the engine is in the initial accelerated or decelerated state is big and the degree of deviation of the air/fuel ratio from the target value is big and the time difference $t_2$ from the time of completion of the accelerated or decelerated state until the predetermined time at which the air/fuel ratio deviates from the target value is big, the value of the correction factor $\gamma_1$ should be made small and the value of the correction factor $\gamma_2$ should be made big".

Based on the rules shown in the tables, the amount $\Delta\gamma_1$ of change of the correction factor $\gamma_1$ and the amount $\Delta\gamma_2$ of change of the correction factor $\gamma_2$ are determined by the following equation:

$$\Delta\gamma_1 = \frac{\sum_i y_{1i} \cdot G_{1i} \cdot S_{1i}}{\sum_i y_{1i} \cdot S_{1i}} \tag{21}$$

$$\Delta\gamma_2 = \frac{\sum_i y_{2i} \cdot G_{2i} \cdot S_{2i}}{\sum_i y_{2i} \cdot S_{2i}} \tag{22}$$

where $G_{1i}$ and $S_{1i}$ represent the center of gravity and the area of each of the following membership functions A1 to A6 (see FIG. 4) in the fuzzy rules 1 to 64:

(A1) the amount $\Delta\gamma_1$ of change of the correction factor $\gamma_1$ is negative big;

(A2) the amount $\Delta\gamma_1$ of change of the correction factor $\gamma_1$ is negative medium;

(A3) the amount $\Delta\gamma_1$ of change of the correction factor $\gamma_1$ is negative small;

(A4) the amount $\Delta\gamma_1$ of change of the correction factor $\gamma_1$ is positive small;

(A5) the amount $\Delta\gamma_1$ of change of the correction factor $\gamma_1$ is positive medium; and (A6) the amount $\Delta\gamma_1$ of change of the correction factor $\gamma_1$ is positive big, and $G_{2i}$ and $S_{2i}$ represent the center of gravity and the area of each of the following membership functions B1 to B7 (see FIG. 5) in the fuzzy rules 1 to 64:

(B1) the amount $\Delta\gamma_2$ of change of the correction factor $\gamma_2$ is negative big;

(B2) the amount $\Delta\gamma_2$ of change of the correction factor $\gamma_2$ is negative medium;

(B3) the amount $\Delta\gamma_2$ of change of the correction factor $\gamma_2$ is negative small;

(B4) the amount $\Delta\gamma_2$ of change of the correction factor $\gamma_2$ is zero;

(B5) the amount $\Delta\gamma_2$ of change of the correction factor $\gamma_2$ is positive small;

(B6) the amount $\Delta\gamma_2$ of change of the correction factor $\gamma_2$ is positive medium; and (B7) the amount $\Delta\gamma_2$ of change of the correction factor $\gamma_2$ is positive big.

Also, $y_{1i}$ ($i=1$ to 6) represents the grade of each of the membership functions A1 to A6 and $Y_{2i}$ ($i=1$ to 7) represents the grade of each of the membership functions B1 to B7. Provided that $x_i$ ($i=1$ to 4) is the grade of each of the following membership functions C1 to C4 (see FIG. 6) in the fuzzy rules 1 to 64 for $\Delta\gamma$:

(C1) the degree of richness of the air/fuel ratio is big;

(C2) the degree of richness of the air/fuel ratio is small;

(C3) the degree of leanness of the air/fuel ratio is small; and (C4) the degree of leanness of the air/fuel ratio is big, $x_i$ ($i=5$ to 8) represents the grade of each of the following membership functions D1 to D4 (see FIG. 7) for $\Delta\theta_{th}$:

(D1) the displacement of the throttle opening angle in the accelerated state is big;

(D2) the displacement of the throttle opening angle in the accelerated state is small;

(D3) the displacement of the throttle opening angle in the decelerated state is small; and (D4) the displacement of the throttle opening angle in the decelerated state is big, $x_i$ ($i=9$ to 10) represents the grade of each of the following membership functions E1 to E2 (see FIG. 8) for $t_1$:

(E1) the time, in which the engine is in the accelerated or decelerated state, is short; and (E2) the time, in which the engine is in the accelerated or decelerated state, is long, and $X_i$ ($i=11$ and 12) represents the degree of matching of each of the following membership functions F1 and F2 (see FIG. 9) for $t_2$:

(F1) the time difference from the time of completion of the accelerated or decelerated state until the predetermined time at which the air/fuel ratio deviates from the target value, is short; and (F2) the time difference from the time of completion of the accelerated or decelerated state until the predetermined time at which the air/fuel ratio deviates from the target value, is long, $y_{1i}$ and $y_{2i}$ are determined from the following equations:

$$y_{11} = \max[\min(x_6, x_{10}, x_1, x_{12}), \min(x_6, x_{10}, x_{11}), \min(x_7, x_{10}, x_4, x_{12}), \min(x_7, x_{10}, x_4, x_{11})] \tag{23}$$

$$y_{12} = \max[\min(x_5, x_{10}, x_1, x_{12}), \min(x_5, x_{10}, x_1, x_{11}), \min(x_5, x_9, x_1, x_{12}), \min(x_5, x_9, x_1, x_{11}), \min(x_6, x_9, x_1, x_{12}), \min(x_6, x_9, x_1, x_{11}), \tag{24}$$

-continued $$\min(x_6, x_{10}, x_2, x_{12}), \min(x_6, x_{10}, x_2, x_{11}),$$
$$\min(x_8, x_{10}, x_4, x_{12}), \min(x_8, x_{10}, x_4, x_{11}),$$
$$\min(x_8, x_9, x_4, x_{12}), \min(x_8, x_9, x_4, x_{11}),$$
$$\min(x_7, x_7, x_4, x_{12}), \min(x_7, x_9, x_4, x_{11}),$$
$$\min(x_7, x_{10}, x_3, x_{12}), \min(x_7, x_{10}, x_3, x_{11})]$$

(25)

$$y_{13} = \max[\min(x_5, x_{10}, x_1, x_{12}), \min(x_5, x_{10}, x_2, x_{11}),$$
$$\min(x_5, x_9, x_2, x_{12}), \min(x_5, x_9, x_2, x_{11}),$$
$$\min(x_6, x_9, x_2, x_{12}), \min(x_6, x_9, x_2, x_{11}),$$
$$\min(x_8, x_{10}, x_3, x_{12}), \min(x_8, x_{10}, x_3, x_{11}),$$
$$\min(x_8, x_9, x_3, x_{12}), \min(x_8, x_9, x_3, x_{11}),$$
$$\min(x_7, x_7, x_3, x_{12}), \min(x_7, x_9, x_3, x_{11})]$$

(26)

$$y_{14} = \max[\min(x_8, x_{10}, x_2, x_{12}), \min(x_8, x_{10}, x_2, x_{11}),$$
$$\min(x_8, x_9, x_2, x_{12}), \min(x_8, x_9, x_2, x_{11}),$$
$$\min(x_9, x_9, x_2, x_{12}), \min(x_7, x_9, x_2, x_{11}),$$
$$\min(x_5, x_{10}, x_3, x_{12}), \min(x_5, x_{10}, x_3, x_{11}),$$
$$\min(x_5, x_9, x_3, x_{12}), \min(x_5, x_9, x_3, x_{11}),$$
$$\min(x_6, x_9, x_3, x_{12}), \min(x_6, x_9, x_3, x_{11})]$$

(27)

$$y_{15} = \max[\min(x_5, x_{10}, x_4, x_{12}), \min(x_5, x_{10}, x_4, x_{11}),$$
$$\min(x_5, x_9, x_4, x_{12}), \min(x_5, x_7, x_4, x_{11}),$$
$$\min(x_6, x_9, x_4, x_{12}), \min(x_6, x_7, x_4, x_{11}),$$
$$\min(x_6, x_{10}, x_3, x_{12}), \min(x_6, x_{10}, x_3, x_{11}),$$
$$\min(x_8, x_{10}, x_1, x_{12}), \min(x_8, x_{10}, x_1, x_{11}),$$
$$\min(x_8, x_9, x_1, x_{12}), \min(x_8, x_9, x_1, x_{11}),$$
$$\min(x_7, x_1, x_{11}, x_{12}), \min(x_7, x_9, x_1, x_{11}),$$
$$\min(x_7, x_{10}, x_2, x_{12}), \min(x_7, x_{10}, x_2, x_{11})]$$

(28)

$$y_{16} = \max[\min(x_7, x_{10}, x_{11}, x_{12}), \min(x_7, x_{10}, x_1, x_{11}),$$
$$\min(x_6, x_{10}, x_4, x_{12}), \min(x_6, x_{10}, x_4, x_{11})]$$

(29)

$$y_{21} = \max[\min(x_7, x_{10}, x_1, x_{12}), \min(x_6, x_{10}, x_4, x_{12})]$$

(30)

$$y_{22} = \max[\min(x_5, x_{10}, x_4, x_{12}), \min(x_5, x_9, x_4, x_{12}),$$
$$\min(x_6, x_9, x_4, x_{12}), \min(x_6, x_{10}, x_3, x_{12}),$$
$$\min(x_8, x_{10}, x_1, x_{12}), \min(x_8, x_9, x_1, x_{12}),$$
$$\min(x_7, x_9, x_1, x_{12}), \min(x_7, x_{10}, x_2, x_{12})]$$

(31)

$$y_{23} = \max[\min(x_8, x_{10}, x_2, x_{12}), \min(x_8, x_9, x_2, x_{12}),$$
$$\min(x_7, x_9, x_2, x_{12}), \min(x_5, x_{10}, x_3, x_{12})$$
$$\min(x_5, x_9, x_3, x_{12}), \min(x_6, x_9, x_3, x_{12})]$$

(32)

$$y_{24} = \max[\min(x_6, x_{10}, x_1, x_{11}), \min(x_7, x_{10}, x_4, x_{11}),$$
$$\min(x_5, x_{10}, x_1, x_{11}), \min(x_5, x_9, x_1, x_{11}),$$

-continued $$\min(x_6, x_9, x_1, x_{11}), \min(x_6, x_{14}, x_2, x_{11}),$$
$$\min(x_8, x_{10}, x_4, x_{11}), \min(x_8, x_9, x_4, x_{11}),$$
$$\min(x_7, x_9, x_4, x_{11}), \min(x_7, x_{10}, x_3, x_{11}),$$
$$\min(x_5, x_{10}, x_2, x_{11}), \min(x_5, x_9, x_2, x_{11}),$$
$$\min(x_6, x_9, x_2, x_{11}), \min(x_8, x_{10}, x_3, x_{11}),$$
$$\min(x_8, x_9, x_3, x_{11}), \min(x_7, x_9, x_3, x_{11})$$
$$\min(x_8, x_{10}, x_2, x_{11}), \min(x_8, x_3, x_2, x_{11}),$$
$$\min(x_7, x_9, x_2, x_{11}), \min(x_5, x_{10}, x_3, x_{11}),$$
$$\min(x_5, x_9, x_3, x_{11}), \min(x_6, x_9, x_3, x_{11}),$$
$$\min(x_5, x_{10}, x_4, x_{11}), \min(x_5, x_9, x_4, x_{11}),$$
$$\min(x_6, x_9, x_4, x_{11}), \min(x_6, x_{10}, x_3, x_{11}),$$
$$\min(x_8, x_{10}, x_1, x_{11}), \min(x_8, x_9, x_1, x_{11}),$$
$$\min(x_7, x_9, x_1, x_{11}), \min(x_7, x_{10}, x_2, x_{11}),$$
$$\min(x_7, x_{10}, x_1, x_{11}), \min(x_6, x_{10}, x_4, x_{11})]$$

(33)

$$y_{25} = \max[\min(x_5, x_{10}, x_2, x_{11}), \min(x_5, x_9, x_2, x_{11}),$$
$$\min(x_6, x_9, x_2, x_{11}), \min(x_8, x_{10}, x_3, x_{11})$$
$$\min(x_8, x_9, x_3, x_{11}), \min(x_7, x_9, x_3, x_{11})]$$

(34)

$$y_{26} = \max[\min(x_5, x_{10}, x_1, x_{11}), \min(x_5, x_9, x_1, x_{11}),$$
$$\min(x_6, x_9, x_1, x_{11}), \min(x_6, x_{10}, x_2, x_{11}),$$
$$\min(x_8, x_{10}, x_4, x_{11}), \min(x_8, x_9, x_4, x_{11}),$$
$$\min(x_7, x_9, x_4, x_{11}), \min(x_7, x_{10}, x_3, x_{11})]$$

(35)

$$y_{27} = \max[\min(x_6, x_{10}, x_1, x_{11}), \min(x_7, x_{10}, x_4, x_{11})]$$

Using the amounts $\Delta\gamma_1$ and $\Delta\gamma_2$ of change of the correction factors determined by use of the fuzzy inference, the values of the correction factors $\gamma_1$ and $\gamma_2$ are corrected as follows:

$$\gamma_1 \leftarrow \gamma_1 + \Delta\gamma_1 \quad \ldots (36)$$

$$\gamma_2 \leftarrow \gamma_2 + \Delta\gamma_2 \quad \ldots (37)$$

Information indispensable for the above fuzzy inference is $\Delta\gamma$. Accordingly, the other input information can be deleted, as required, thereby allowing the simplification of the processing. Also, as input information in the fuzzy inference representing the magnitude of acceleration or deceleration may be used a displacement of the air quantity or a displacement of the internal pressure of the intake manifold in lieu of the displacement of the throttle opening angle.

Finally, in step 309, the flag ICAL is set to "0", thereby completing the processing.

The explanation of the program for automatic matching of the fuel system parameters is terminated by the above.

Next, explanation will be made of the operation of a program which determines, upon entry from the steady operating state into the accelerated or decelerated state, a displacement $\Delta\theta_{th}$ of the throttle opening angle in the initial accelerated or decelerated state and a time $t_1$ in which the engine is in the initial accelerated or decelerated state. The explanation will be made by virtue of FIG. 10.

First, in step 1000, the judgement is made as to whether or not the flag IMAFO is "1". If the flag is "1", the flow goes to the next process of step 1001. If the flag is not "1", the processing is completed.

In step 1001, the throttle opening angle $\theta_{ths}$ at the present time is stored into a predetermined region of the RAM.

Next, in step 1002, the judgement is made as to whether or not the acceleration/deceleration judgement flag IFRG is "0". The flow goes to step 1003 if the flag is "0" and to step 1004 if the flag is not "0".

In step 1003, the judgement is made as to whether or not the throttle opening angle satisfies the following relation:

$$\theta_{th}(i)-\theta_{th}(i-1)>K_i \quad \ldots (38)$$

where i represents a time (one time is equal to 10 msec) and $K_i$ is a positive constant.

If the relation (38) is satisfied, the flow goes to step 1005. If the relation (38) is not satisfied, the flow goes to step 1006. In step 1005, a time counter tcnt1 is incremented by 1, thereby completing the processing.

In step 1004, the judgement is made as to whether or not the throttle opening angle satisfies the following relation:

$$\theta_{th}(i)-\theta_{th}(i-1)<-K_i \quad \ldots (39)$$

where i is a time (one time is equal to 10 msec) and $K_i$ is a positive constant.

If the relation (39) is satisfied, the flow goes to step 1005. If the relation (39) is not satisfied, the flow goes to step 1006. In step 1005, the time counter tcntl is incremented by 1, thereby completing the processing.

In step 1006, the accelerated or decelerated state is regarded as having been completed and a displacement $\Delta\theta_{th}$ of the throttle opening angle is determined from the following equation:

$$\Delta\theta_{th}=\theta_{the}-\theta_{tus} \quad \ldots (40)$$

where $\theta_{the}$ is the throttle opening angle at the present time and $\theta_{ths}$ is the throttle opening angle at the time at which the engine entered the accelerated or decelerated state.

Next, in step 1007, a time $t_1$ in which the engine was in the accelerated or decelerated state, is determined from the following equation:

$$t_1=tcnt1\cdot\Delta t \quad \ldots (41)$$

where Δt is the period of execution of the program.

Next, in step 1008, the time counter tcnt1 is cleared to 0. Next, in step 1009, "0" is set into the flag IMAFO, thereby completing the entire processing.

Explanation will now be made of the operation of a program for determining the degree $\Delta\gamma$ of leanness or richness of the air/fuel ratio and a time difference $t_2$ from the time of completion of the accelerated or decelerated state until a predetermined time at which the air/fuel ratio deviates from the target value. The explanation will be made on the basis of FIG. 11.

First, in step 1100, the judgement is made as to whether or not the flag IMAF is "1". If the flag is "1", the flow proceeds to a process of step 1101. If the flag is not "1", the processing is completed.

In step 1101, the judgement is made as to whether or not the flag IMAFO is "1". If the flag is "1", processes in and after step 1103 are performed. If the flag is "0", a process of step 1102 for calculating a variable $t_2$ is performed regarding the initial accelerated or decelerated state as having been completed.

In step 1102, a time counter tcnt2 is incremented by 1. The initial value of variable tcnt2 is zero.

Next, in step 1103, the judgement is made as to whether or not the correction factor $\gamma$ (or feedback correction coefficient) for fuel injection time having been corrected and calculated on the basis of the output of the oxygen sensor satisfies the following relation:

$$1.0-\gamma_0<\gamma<1.0+\gamma_0 \quad \ldots (42)$$

where $\gamma_0$ is a positive constant.

If the relation (42) is satisfied, the flow goes to a process of step 1104 on the judgement that the air/fuel ratio is not yet beginning to become lean or rich. If the relation (42) is not satisfied, processes in and after step 1107 are performed.

Figure 12A:
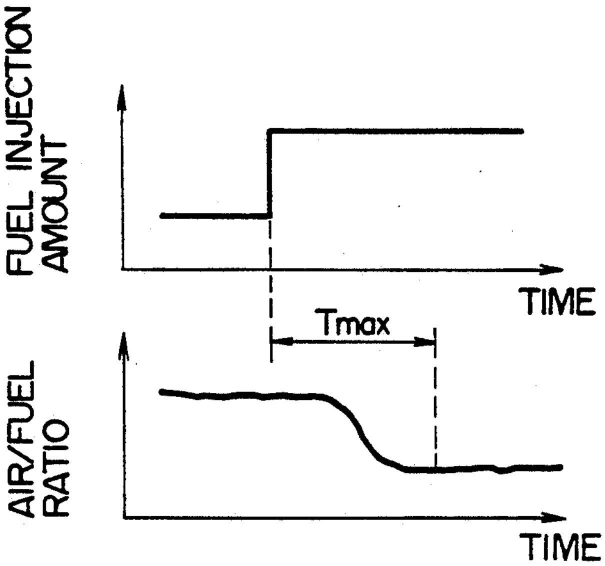
FIGS. 12A and 12B are diagrams for explaining the calculation of a range of time over which a control error extends.
Figure 12B:
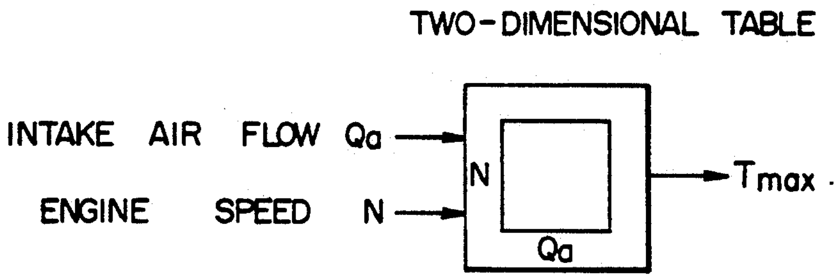

In step 1104, a time range is determined over which an error of the air/fuel ratio in control extends. For that purpose, a table shown in FIG. 12B is searched by means of the rotation speed N and the intake air quantity $Q_a$ to determine a variable $T_{max}$ indicative of the time extension over which the air/fuel ratio control error extends after the completion of the accelerated or decelerated state. Table data is obtained by a method shown in FIG. 12A, that is, by measuring a response of the air/fuel ratio when the fuel injection quantity is stepwise changed with various conditions of the engine being kept constant and determining $T_{max}$ as a time from the step-like change until the completion of the response. This measurement is conducted for various rotation speeds and air quantities and the determined values of $T_{max}$ are stored in the table.

In step 1105, the judgement is made as to whether or not the time counter tcnt2 satisfies the following relation:

$$tcnt2>T_{max}/\Delta t \quad \ldots (43)$$

where Δt is the period of execution of the program under consideration.

If the relation (43) is satisfied, processes in and after step 1106 are performed on the judgement that no variation in air/fuel ratio occurred in the initial accelerated or decelerated state. In step 1106, $\Delta\gamma$ is set to 0. Thereafter, the flow proceeds to step 1111. Processes in and after step 1111 will be mentioned later on.

In step 1107, the judgement as to whether or not the inversion of the feedback correction factor $\gamma$ has been started at present time i is made in accordance with whether or not the two following relations are satisfied:

$$\gamma(i-1)>1.0+\gamma_0 \quad \ldots (44)$$

$$\gamma(i)-\gamma(i-1)<0 \quad \ldots (45)$$

where i represents a time (one time is equal to 210 msec which is a period of $\gamma$). If the two relations (44) and (45) are satisfied, processes in and after step 1109 are performed on the judgement that the inversion has been started.

In step 1108 too, the judgement as to whether or not the inversion of the feedback correction factor $\gamma$ has been started at present time i, is made in accordance with whether or not the two following relations:

$$\gamma(i-1)<1.0-\gamma_0 \quad \ldots (46)$$

$$\gamma(i)-\gamma(i-1)>0 \quad \ldots (47)$$

where i represents a time (one time is equal to 20 msec). If the two relations (46) and (47) are satisfied, processes in and after step 1109 are performed on the judgement that the inversion has been started. If the case is not so, the processing in the program under consideration is completed.

In step 1109, a variable $t_2$ is determined by the following equation:

$$t_2=\Delta t \cdot tcnt2 \quad \ldots (48)$$

where $\Delta t$ is the period of execution of the program under consideration.

Next, in step 1110, the degree $\Delta\gamma$ of leanness or richness of the air/fuel ratio is determined by the following equation:

$$\Delta\gamma=\gamma(i-1)-1.0 \quad \ldots (49)$$

Value $\Delta\gamma$ can be derived by calculating $$\Delta\gamma=\gamma(i-1)-(1.0+\gamma_0) \text{ when } \gamma(i-1)>1.0+\gamma_0, \text{ or}$$

$$\Delta\gamma=\gamma(i-1)-(1.0-\gamma_0) \text{ when } \gamma(i-1)<1.0-\gamma_0.$$

Next, in step 1111, the time counter tcnt2 is cleared to 0. Next, in step 1112, the flag IMAF is tuned to "0". The entire processing is completed by the above.

The foregoing explanation has been made of the fuel system parameter learning system in the case where the control system includes an oxygen sensor.

Next, explanation will be made of a parameter learning control system in the case where a control system includes an air/fuel ratio sensor and a feedback control of an air/fuel ratio is made on the basis of the sensor output or in the case where no feedback control is made and the sensor is provided for only the purpose of learning.

Figure 13A:
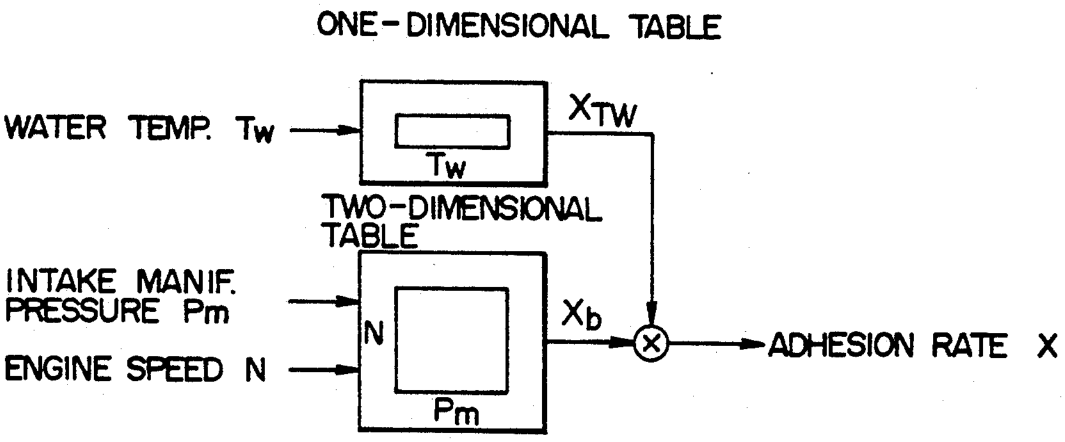
FIGS. 13A and 13B respectively show tables in which the adhesion rate and the runaway rate are stored.
Figure 13B:
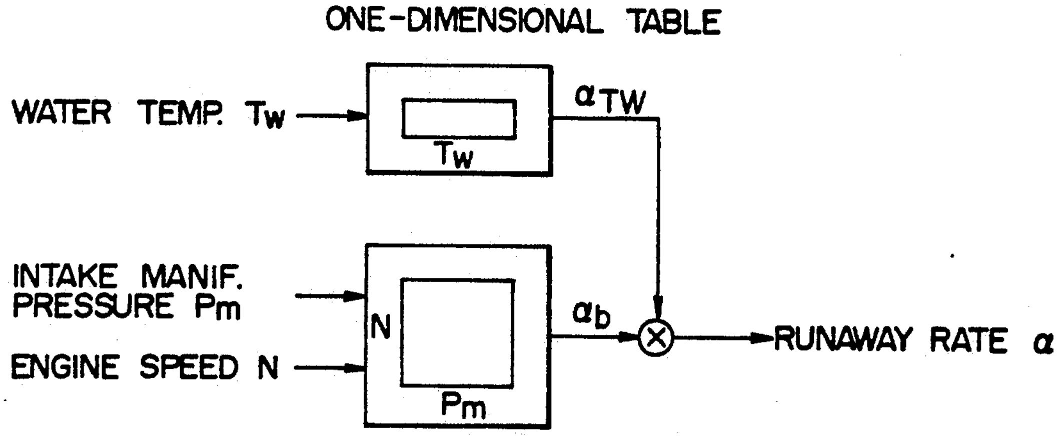
Figure 14:
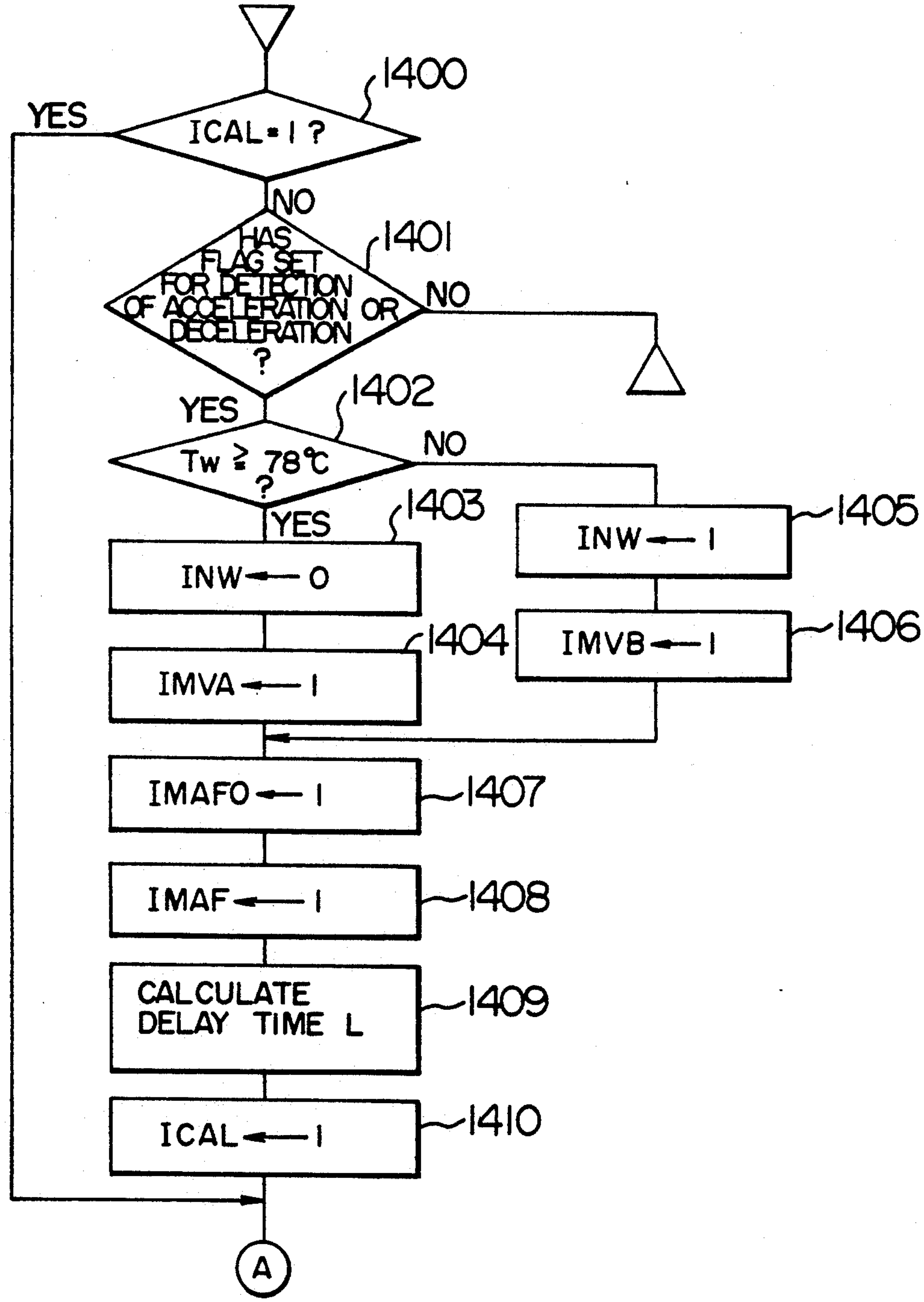
FIGS. 14 and 15 show, as a whole, a flow chart of a learning control program when an air/fuel ratio sensor is used.
Figure 15:
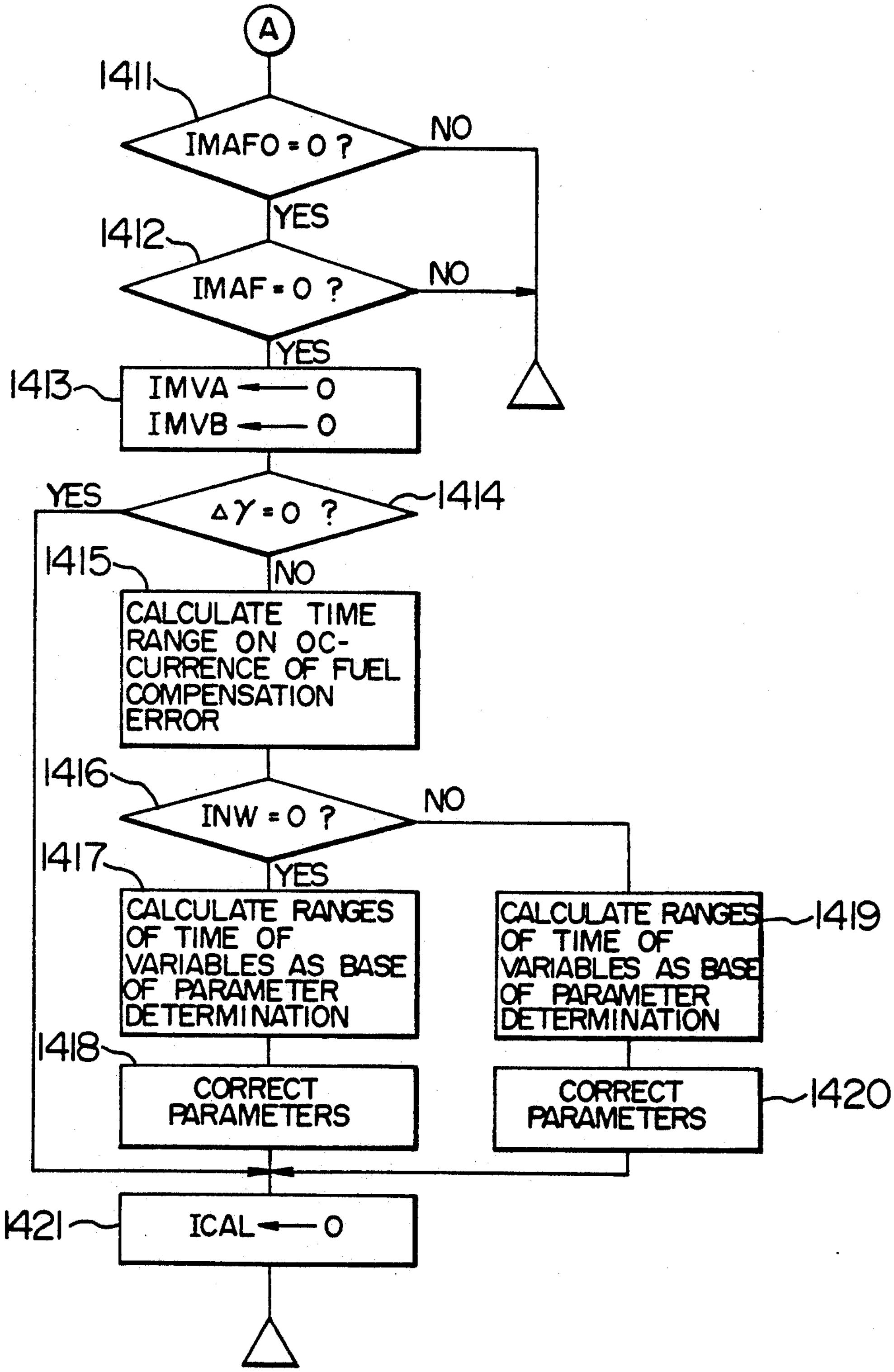

FIGS. 14 and 15 show, as a whole, a flow chart of a program which is used in such a parameter learning control system. Herein, the adhesion rate X (or the runaway rate $\alpha$) is determined from the product of a value $X_b$ (or $\alpha_b$) which is obtained by the search of a two-dimensional table concerning the internal pressure of intake manifold and the rotation speed of engine and a value $X_{tw}$ (or $\alpha_{tw}$) which is obtained by the search of a one-dimensional table concerning the water temperature, as shown in FIG. 13A (or 13B). In this program, data matching in the two-dimensional table concerning the internal pressure of intake manifold and the rotation speed is made when an engine is in a warming-up completed state. In the other case, data matching in the one-dimensional table concerning the water temperature is made. For water temperatures equal to or higher than 78° C., the data of the one-dimensional table concerning the water temperature is always 1.0. First, in step 1400, the judgement is made as to whether or not a flag ICAL indicating the completion/incompletion of subsequent processes up to step 1410 is "1". If the flag is "1", the flow proceeds to step 1411. If the flag is not "1", the flow proceeds to step 1401. In step 1401, the judgement is made as to whether or not the operating state of the engine has been transferred from a steady state to an accelerated or decelerated state. The judgement condition mentioned earlier can be used.

Further, an acceleration/deceleration judgement flag IFRG is set to "0" when the entry into the accelerated state is determined and to "1" when the entry into the decelerated state is determined.

In the case where the entry into the accelerated or decelerated state from the steady state is determined, the flow proceeds to the next process of step 1402. If the case is not so, the processing is completed.

In step 1402, the judgement is made as to whether or not the water temperature is equal to or higher than 78° C. If the temperature is equal to or higher than 78° C., the flow proceeds to step 1403. If the temperature is lower than 78° C., a process of step 1405 is performed. In step 1405, a flag INW indicating that the engine is not in a warming-up completed state, is set to "1". Next, in step 1406, a flag IMVB for storage of time-serial data of a water temperature, which is a variable as the base of parameter determination, is set to "1". The storage of this variable is performed by another program in which the storage of detection data is started in response to the turn-on of the storage flag IMVB to "1".

On the other hand, in step 1403, the flag INW is set to "0". Further, in step 1404, a flag IMVA for storage of time-serial data of the internal pressure $P_m$ of an intake manifold and the rotation speed N of the engine, which are variables as the base of determination of the adhesion rate X and the runaway rate $\alpha$, is set to "1". The storage of the two variables is performed by another program in which the storage of detection data is started in response to the turn-on of the storage flag IMVA to "1".

Next, in step 1407, "1" is set into a flag IMAFO for commanding the determination of a time $t_1$ in which the engine is in the initial accelerated or decelerated state and a displacement $\Delta\theta_{th}$ of the throttle opening angle in that time. Next, in step 1408, "1" is set into a flag IMAF for commanding the calculation of the degree $\Delta\gamma$ of leanness or richness of the air/fuel ratio in the accelerated or decelerated state, a time difference $t_2$ from the time of completion of the accelerated or decelerated state until a predetermined time at which the air/fuel ratio deviates from a target value, a time $t_3$ from the entry into the accelerated or decelerated state until the air/fuel ratio begins to become lean or rich, a time $t_4$ in which the air/fuel ratio is in the lean or rich state and a time $t_5$ in which the two variables $P_m$ and N are all in a monotonically increasing or decreasing condition in the accelerated or decelerated state. If the air/fuel ratio is in the lean or rich state plural times, the time $t_4$ is defined for the case where the air/fuel ratio is first the lean or rich state. Similarly, if the mono-tonically increasing or decreasing condition is produced plural times, the time $t_5$ is defined for the case where the monotonically increasing or decreasing condition is first produced. The calculation of the five variables $\Delta\gamma$, $t_2$, $t_3$, $t_4$ and $t_5$ are performed by another program the operation of which will be mentioned later on.

Figure 16A:
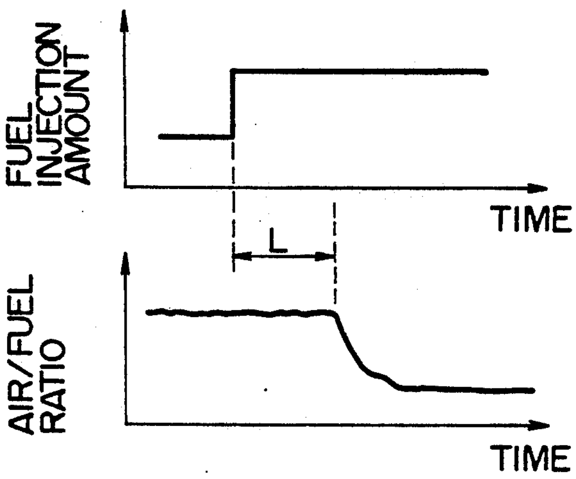
FIGS. 16A and 16B are diagrams for explaining a method for determining a delay time.
Figure 16B:
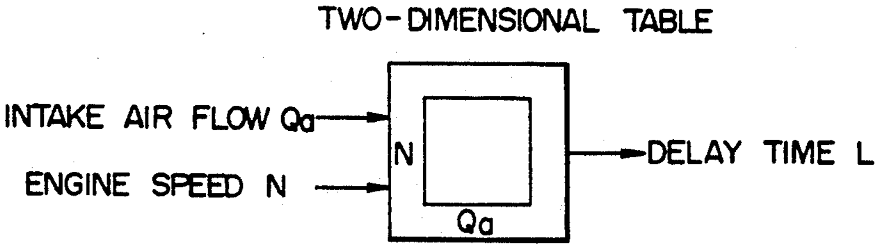

Next, in step 1409, there is calculated a delay time L from the start of compensation for fuel transport delay in the accelerated or decelerated state until the appearance of the effect of compensation on the output of an air/fuel ratio sensor disposed at an exhaust pipe collecting portion. The calculation of the delay time L can be made, for example, as follows. The rotation speed N and the intake air quantity $Q_a$ are considered as parameters which depend upon the delay time L. Accordingly, by measuring a response of the air/fuel ratio of a mixture or exhaust air at the position of an oxygen sensor when the fuel injection quantity is stepwise changed with the rotation speed N and the intake air quantity $Q_a$ being kept constant, as shown in FIG. 16A, the delay time L is determined as a time from the change of the fuel injection quantity until the start of the response of the air/fuel ratio, as shown. The delay times L are determined in some operating ranges and the determined values are stored in a two-dimensional table shown in FIG. 16B. The determination of the delay time L in step 1409 can be made by searching this table. Next, in step 1410, the flag ICAL is set to "1".

Next, in step 1411, the judgement as to whether or not the calculation of $t_1$ and $\Delta\theta_{th}$ mentioned above has been completed, is made referring to the flag IMAFO. If the flag IMAFO is "0", it is indicated that the calculation has been completed. If the flag is "1", it is indicated that the calculation is being performed. In the case where the flag is "0", the flow proceeds to the next process of step 1412. In the case where the flag is "1", the processing is completed.

In step 1412, the judgement as to whether or not the calculation of $\Delta\gamma$ and $t_2$ to $t_5$ mentioned above has been completed, is made referring to the flag IMAF. If the flag IMAF is "0", it is indicated that the calculation has been completed. If the flag is "1", it is indicated that the calculation is being performed. In the case where the flag is "0", the flow proceeds to the next process of step 1413. In the case where the flag is "1", the processing is completed.

In step 1413, the flags IMVA and IMVB are turned to "0", thereby stopping the storage of detection data.

Next, in step 1414, the judgement is made as to whether or not the calculated degree $\Delta\gamma$ of leanness or richness is 0. If $\Delta\gamma$ is 0, the flow goes to step 1421. This means that there is no need of parameter correction since a desired air/fuel control performance has been attained in the accelerated or decelerated state.

In step 1415, a time range is calculated in which an error in compensation for fuel transport delay causing the generation of lean or rich spikes of the air/fuel ratio occurs after the acceleration or deceleration has been started. This time range is calculated by use of the above variables $t_1$, $t_2$, $t_3$, $t_4$ and $t_5$ as being a range from the time of $(t_3-L)$ to the time of $\min[t_3+t_4-L, t_5, t_1]$ after the start of acceleration or deceleration.

Next, in step 1416, the judgement is made as to whether or not the flag INW is "0". If the flag is "0", processes in and after step 1417 are performed on the judgement that the engine is in a warming-up completed state. Those processes are performed for matching table data of the two two-dimentional tables concerning the internal pressure $P_m$ of intake manifold and the rotation speed N shown in FIGS. 13A and 13B. On the other hand, if the flag INW is not "0", processes in and after step 1419 are performed. Those processes are performed for matching data of the two one-dimensional tables concerning the water temperature shown in FIGS. 13A and 13B and the explanation thereof will be made later on.

In step 1417, a range is examined in which each of the internal pressure $P_m$ of intake manifold and the rotation speed N, which are variables as the base of determination of parameters X and $\alpha$, has changed in the above time range. This range of change is determined as values between a value of the variable stored after the time of $(t_3-L)$ from the start of acceleration or deceleration and a value thereof stored after the time of $\min[t_3+t_4-L, t_5, t_1]$. Provided that the values of the variables $P_m$ and N after the time of t from the start of acceleration or deceleration are $P_m(t)$ and N(t), the ranges of change of the variables $P_m$ and N are as follows:

$$\min[P_m(t_6), P_m(t_7)] \leqq P_m \leqq \max[P_m(t_6), P_m(t_7)] \quad \ldots (50)$$

$$\min[N(t_6), N(t_7)] \leqq N \leqq \max[N(t_6), N(t_7)] \quad \ldots (51)$$

where $t_6$ and $t_7$ satisfy the following equations:

$$t_6 = t_3 - L \quad \ldots (52)$$

$$t_7 = \min[t_3 + t_4 - L, t_5, t_1] \quad \ldots (53)$$

In step 1418, the values of the adhesion rate $X_b$ and the runaway rate $\alpha_b$ stored in the tables for the internal pressure $P_m$ of intake manifold and the engine rotation speed N in the above range of change are first corrected using a fuzzy inference. The rules mentioned earlier are used as fuzzy rules. Using the values of $\Delta\gamma_1$ and $\Delta\gamma_2$ determined by the fuzzy inference, the characteristics of the adhesion rate $X_b$ and the runaway rate $\alpha_b$ set in RAM are corrected as follows. As correction equations are used the following equations:

$$X_{bnew} = X_{bold} + \Delta\gamma_1 \quad \ldots (54)$$

where $X_{bold}$ is the original value of the adhesion rate and $X_{bnew}$ is a new value of the adhesion rate, and $$\alpha_{bnew} = \alpha_{bold} + \Delta\gamma_2 \quad \ldots (55)$$

where $\alpha_{bold}$ is the original value of the runaway rate and $\alpha_{bnew}$ is a new value of the runaway rate.

The original table data $X_{old}$ in the ranges of the relations (50) and (51) is corrected to the new table data $X_{new}$ determined using the equation (54). Similarly, the original table data $\alpha_{old}$ in the ranges of the relations (50) and (51) stored in the two-dimensional table concerning the internal pressure of intake manifold and the rotation speed is corrected to the new table data $\alpha_{new}$ determined using the equation (55).

Figure 17:
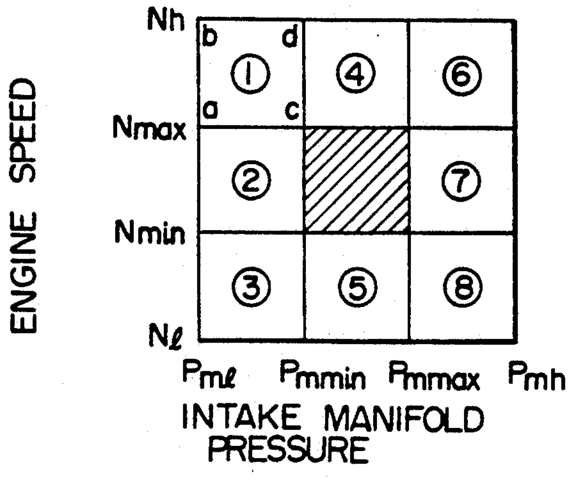
FIG. 17 shows a region of a two-dimensional table where the control error occurred.

Next, table data outside the ranges of the relations (50) and (51) is corrected in order to ensure the continuity of the characteristics of the adhesion rate and the runaway rate. FIG. 17 shows an area of the two-dimensional table of the adhesion rate or the runaway rate. A hatched portion represents a region where a control error occurred, and data in that region is corrected on the basis of the equation (54) or (55). Correction for eight other regions (1) to (8) is made as follows.

In the region (1), new data for that region is determined by four-point interpolation which uses new data determined on the basis of the equation (54) or (55) only for the coordinate c and the original data for the other coordinates a, b and d.

More particularly, provided that the coordinates a, b, c and d are $(P_{m1}, N_{max})$, $P_{m1}, N_h)$, $(P_{mmin}, N_{max})$ and $(P_{mmin}, N_h)$, respectively the new data in the region (1) is determined by the following equation:

$$X_{bnew}(P_m, N) = f(P_m, N, P_{me}, P_{mmin}, N_{max}, N_h, \quad (56)$$

-continued $X_{bold}(P_{me}, N_{max}), X_{bold}(P_{me}, N_h), X_{bnew}(P_{mmin}, N_{max}),$ $X_{bold}((P_{mmin}, N_h)]$ where a function f is an operation expression for four-point interpolation which is given by the following equation:

$$f(x, y, x_1, x_2, y_1, y_2, A, B, C, D) = \frac{A(y_2 - y)(x_2 - x) + B(y_2 - y)(x - x_1) + C(x_2 - x)(y - y_1) + D(x - x_1)(y - y_1)}{(x_2 - x_1)(y_2 - y_1)} \quad (57)$$

In the other regions too, data is similarly updated.

Explanation will now be made of the processes in and after step 1419 for matching data of the two one-dimensional tables concerning the water temperature. In step 1419, a range is examined in which the water temperature has changed in the time range calculated in step 1415. Provided that the value of the water temperature after the time of t from the start of acceleration of deceleration is $T_w(t)$, the range of change of the variable $T_w$ is as follows:

$$T_w(t_6) \leqq T_w \leqq T_w(\min[t_3 + t_4 - L, t_1]) \quad \ldots (58)$$

Next, in step 1420, data in the two one-dimensional tables concerning the water temperature in the range of change defined by the relation (58) are first corrected. As correction equations are used the following equations:

$$X_{Twnew} = X_{Twold} + \Delta\gamma_1 \quad \ldots (59)$$

$$\alpha_{Twnew} = \alpha_{Twold} + \Delta\gamma_2 \quad \ldots (60)$$

The original data $X_{Twold}$ and $\alpha_{Twold}$ in the range defined by the relation (58) are corrected to $X_{Twnew}$ and $\alpha_{Twnew}$ calculated using the equations (59) and (60). In the case where no data is present in the range of the relation (58), it is not possible to effect data correction.

Next, table data outside the range defined by the relation (58) is corrected in order to ensure the continuity of data of each one-dimensional table concerning the water temperature. This correction is performed even in the case where the data correction in the range of the relation (58) is not made because no data is present in that range. As correction equations are used the following equations (61), (62), (65) and (66):

when $T_w \leqq T_w(t_6)$, $$X_{Twnew}(T_w) = \frac{X_{k1} - X_{Twold}(T_{wo})}{T_w(t_6) - T_{wo}} (T_w - T_{wo}) + X_{Twold}(T_{wo}) \quad (61)$$

$$\alpha_{Twnew}(T_w) = \frac{\alpha_{k1} - \alpha_{Twold}(T_{wo})}{T_w(t_6) - T_{wo}} (T_w - T_{wo}) + \alpha_{Twold}(T_{wo}) \quad (62)$$

where $T_{w0}$ is the lower limit value of axial data of the one-dimensional table concerning the water temperature, and $X_{k1}$ and $\alpha_{k1}$ satisfy the following equations:

$$X_{k1} = X_{Twold}(T_w(t_6)) + \Delta\gamma_1 \quad \ldots (63)$$

$$\alpha_{k1} = \alpha_{Twold}(T_w(t_6)) + \Delta\gamma_2 \quad \ldots (64)$$

and when $T_w \geqq T_w(t_7)$, $$X_{Twnew}(T_w) = \frac{1 - X_{k2}}{80 - T_w(t_7)} (T_w - 80) + 1.0 \quad (65)$$

$$\alpha_{Twnew}(T_w) = \frac{1 - \alpha_{k2}}{80 - T_w(t_7)} (T_w - 80) + 1.0 \quad (66)$$

where $X_{k2}$ and $\alpha_{k2}$ satisfy the following equations:

$$X_{k2} = X_{Twold}(T_w(t_7)) + \Delta\gamma_1 \quad \ldots (67)$$

$$\alpha_{k2} = \alpha_{Twold}(T_w(t_7)) + \Delta\gamma_2 \quad \ldots (68)$$

The original data $X_{Twold}$ and $\alpha_{Twold}$ are corrected to $X_{Twnew}$ and $\alpha_{Twnew}$ calculated using the equations (61) to (68). Finally, in step 1421, the flag ICAL is set to "0".

By the foregoing, the processing of the program for making the learning of the adhesion rate and the run-away is completed.

Figure 18:
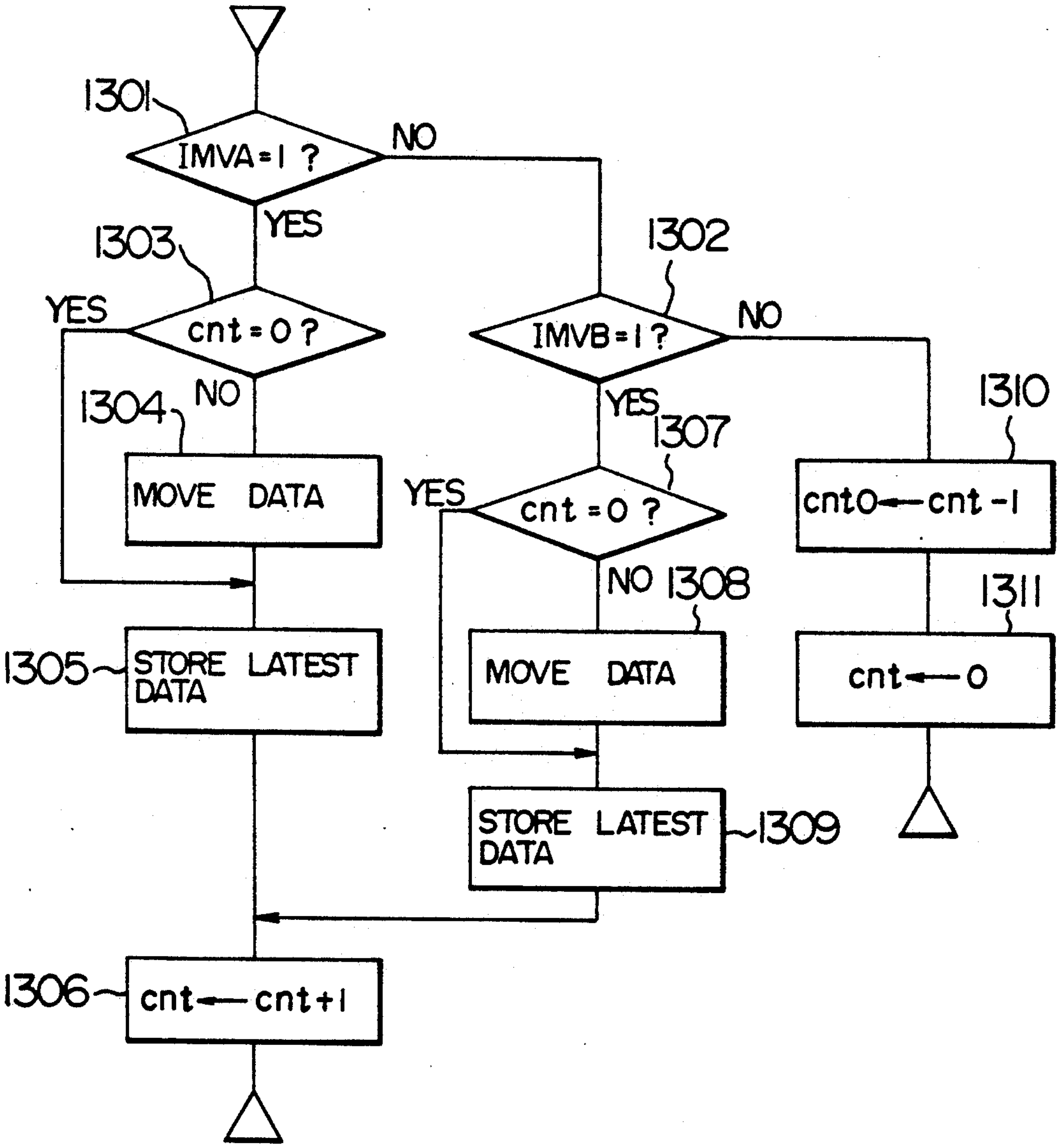
FIG. 18 is a flow chart of a program for storing detection data.

Next, the operation of a program for storing detection data will be explained in accordance with FIG. 18. This program is executed at a period of 10 msec.

First, in step 1301, the judgement is made as to whether or not the flag IMVA is "1". If the flag is "1", the flow proceeds to a process of step 1303. If the flag is not "1", the flow goes to step 1302.

First, processes in and after step 1303 will be explained. In step 1303, the judgement is made as to whether or not a counter cnt is 0. The flow proceeds to step 1305 if the counter cnt is 0 and to step 1304 if it is not 0. The function of the counter cnt will be mentioned later on.

Figure 19:
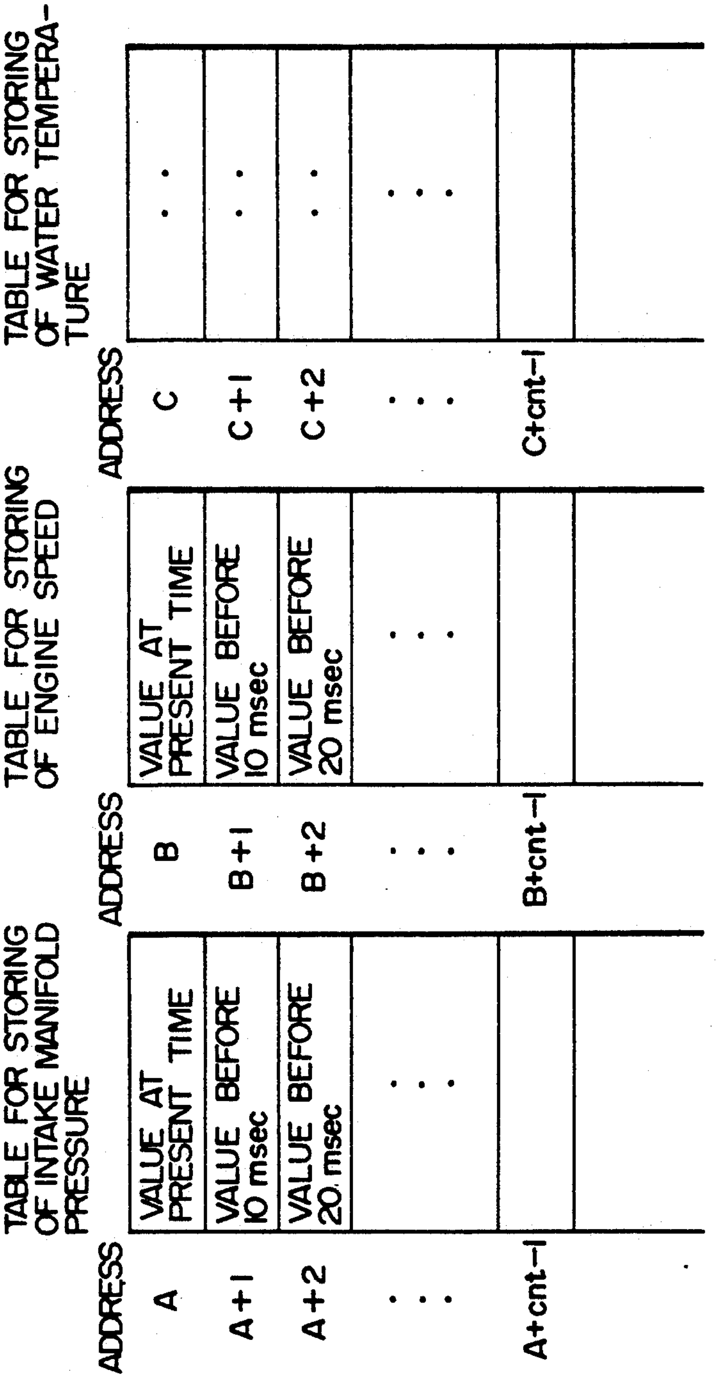
FIG. 19 shows tables for storing the detection data.
Figure 20:
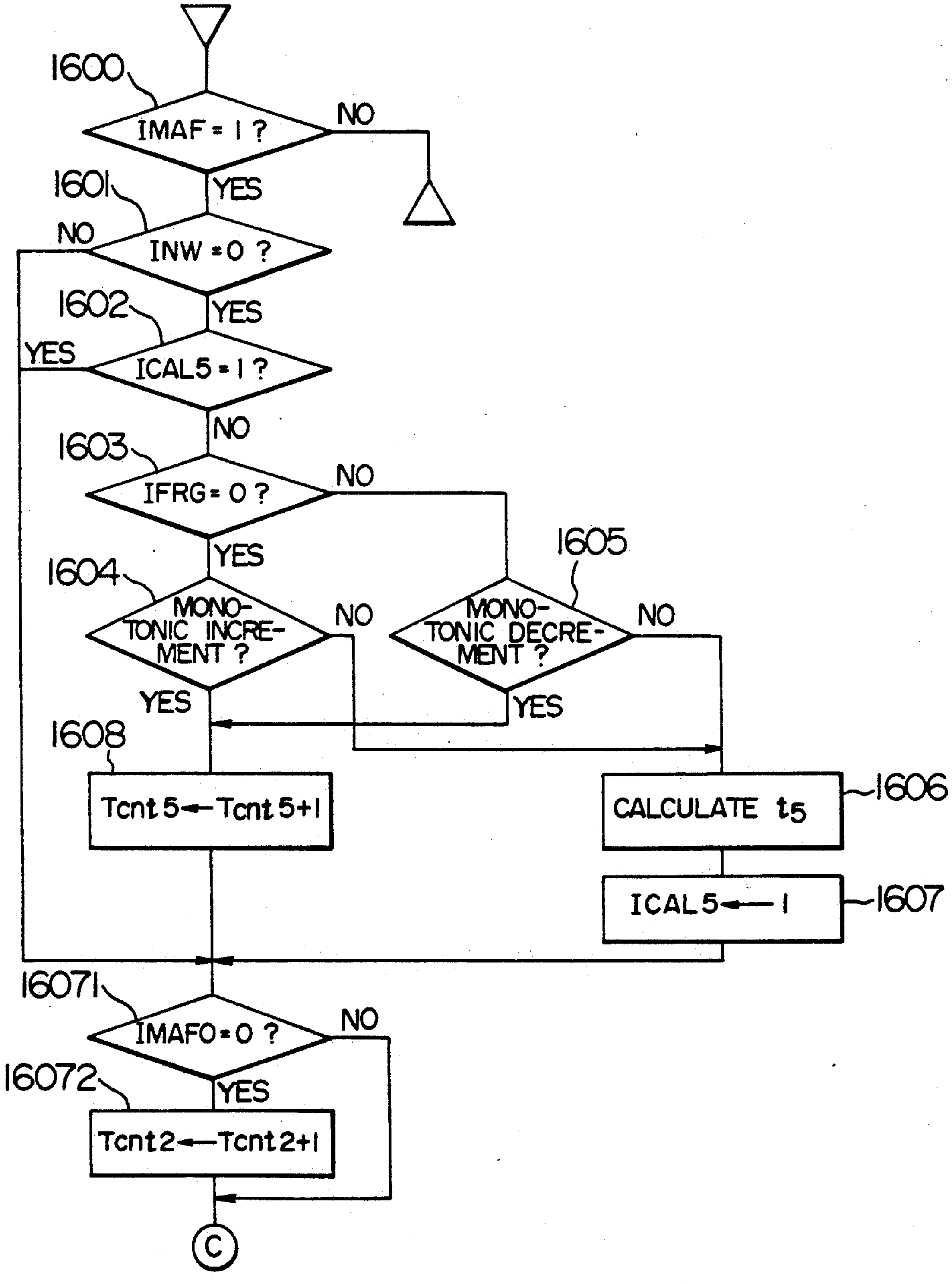
FIGS. 20 to 23 show, as a whole, a flow chart of a program for calculating the degree of leanness or richness of the air/fuel ratio, etc. when the air/fuel sensor is used.
Figure 21:
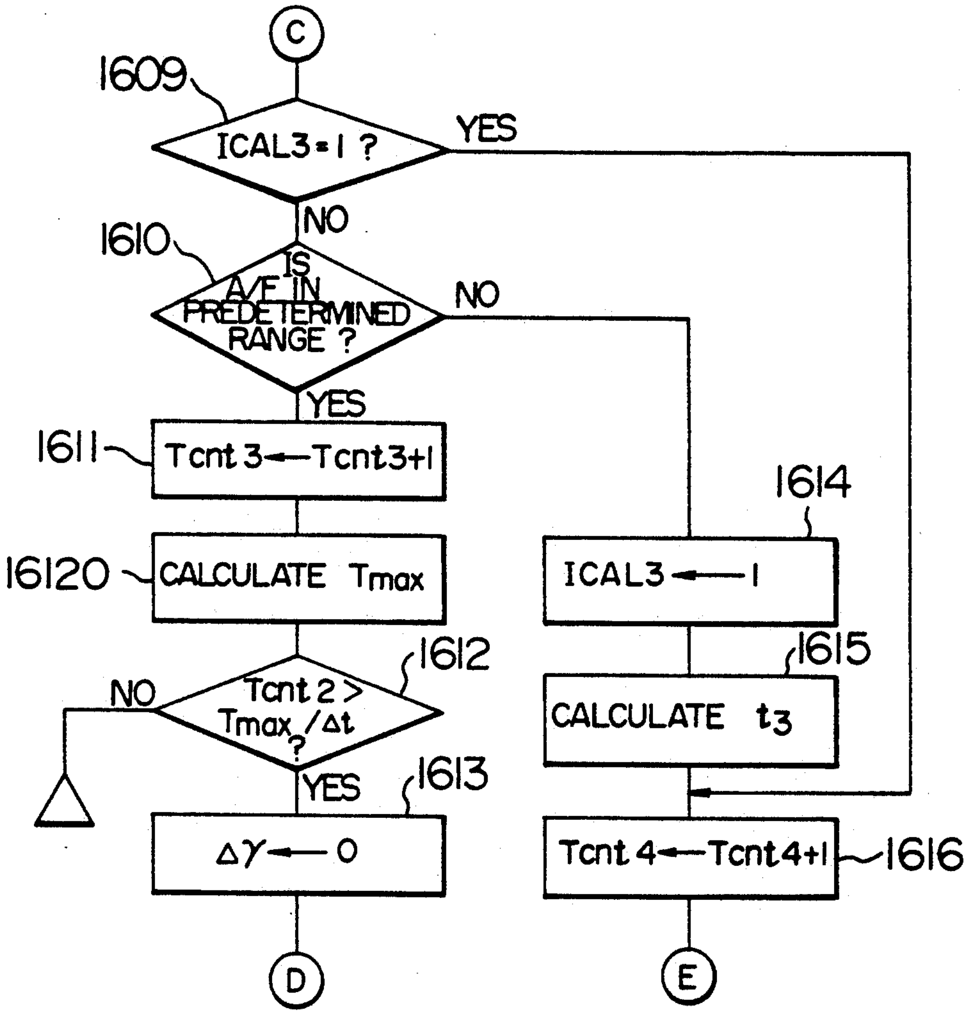
Figure 24:
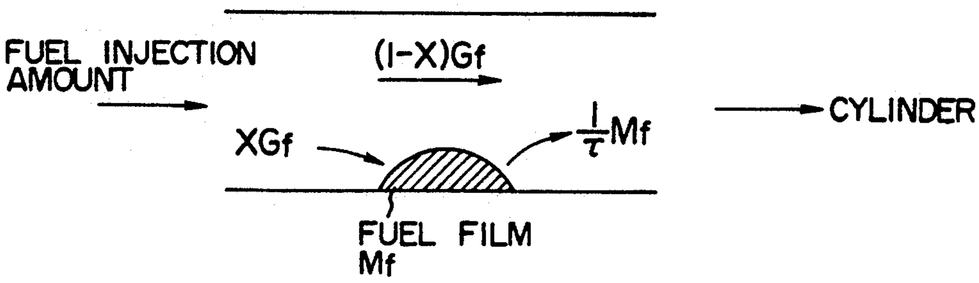
FIG. 24 is a diagram showing the flow of fuel in an intake manifold.
Figure 22:
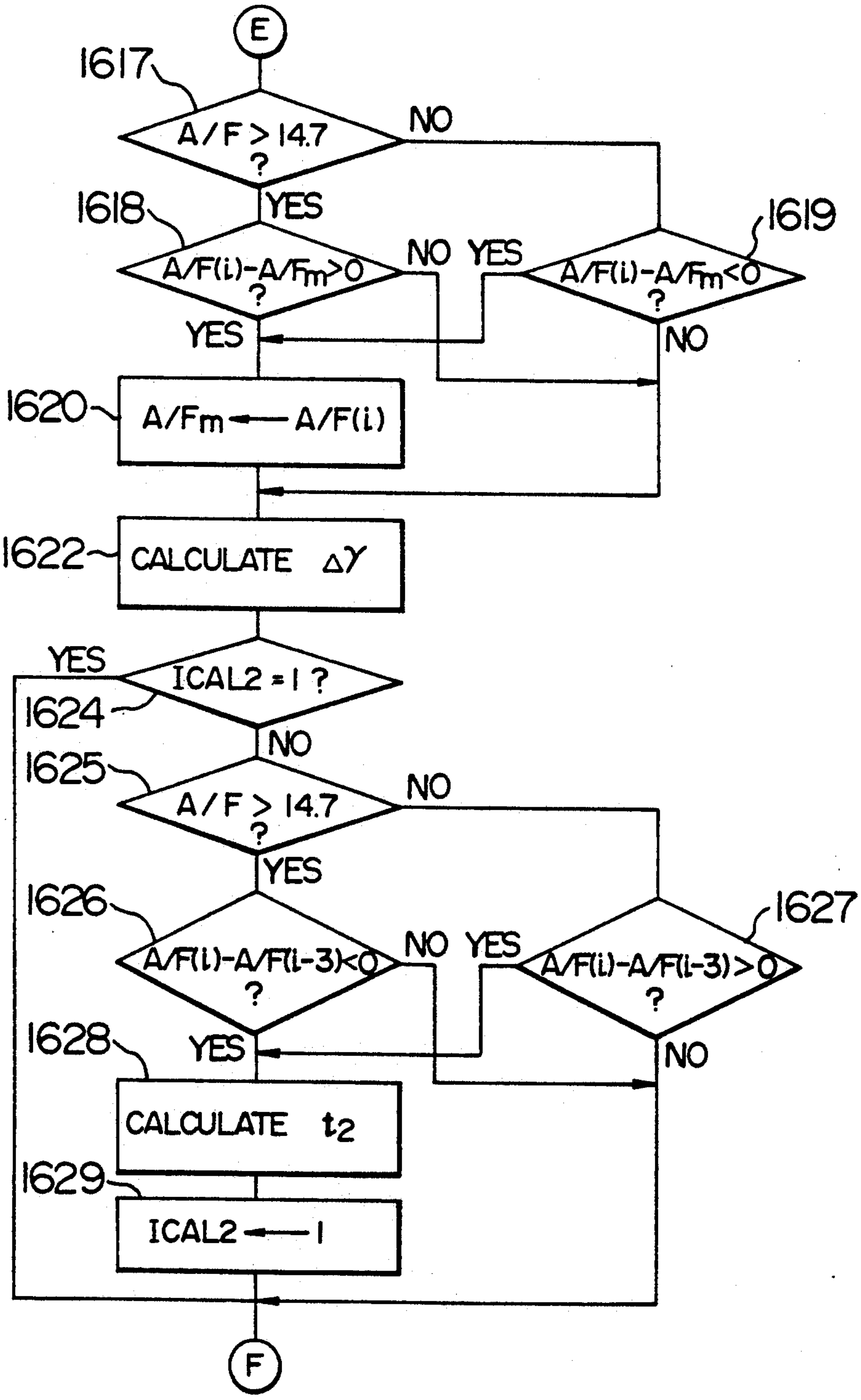
Figure 23:
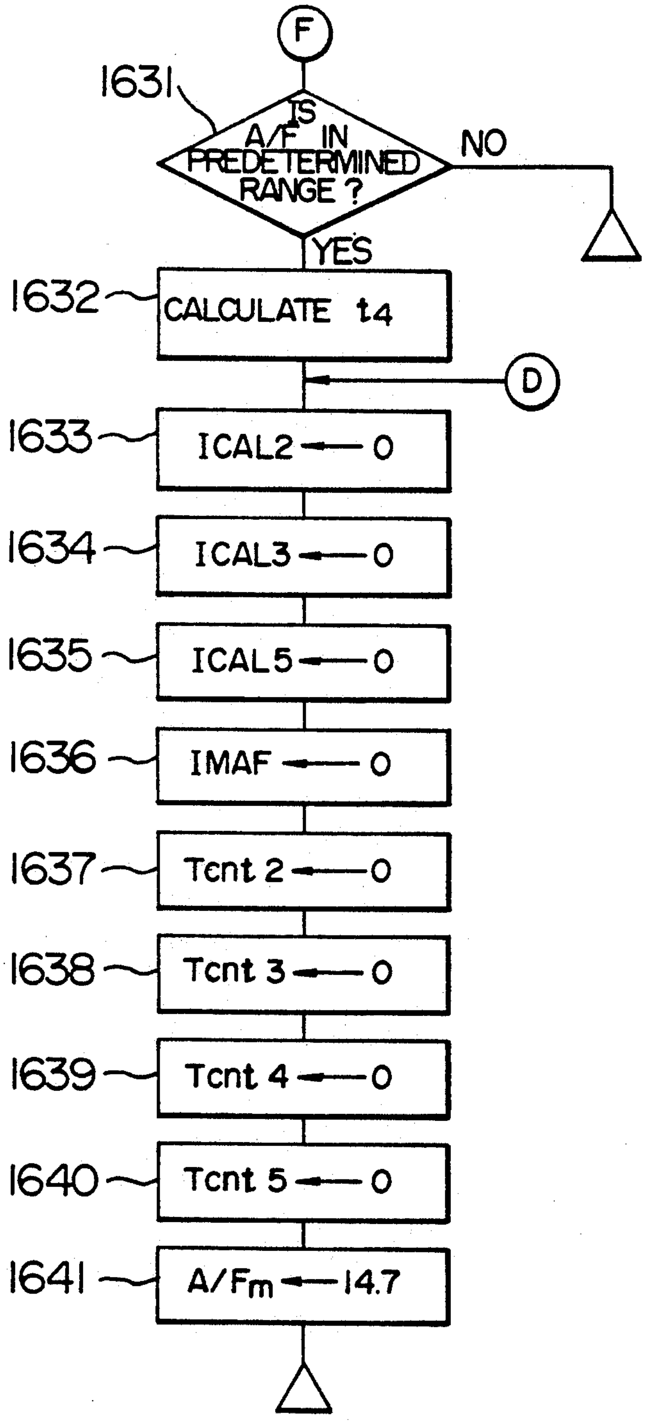

In step 1304, a process for movement of stored values of detection data is performed. Locations for storage of data of the internal pressure of intake manifold, the rotation speed and the water temperature detected at the present time and before 10 msec. 20 msec.—are preliminarily prepared in the RAM area, as shown in FIG. 19. Addresses A, B and C are storage locations of detection data at the present time, addresses A+1, B+1 and C+1 are storage locations of detection data before 10 msec, and addresses A+2, B +2 and C+2 are storage locations of detection data before 20 msec. Addresses A+cnt−1 and B+cnt−1, C+cnt−1 are storage locations of data first stored. The initial value of the counter cnt is 0 and the counter cnt is updated in steps which will be mentioned later on. In step 1304, data at addresses A+cnt−1 and B+cnt−1 are moved to addresses A+cnt and B+cnt. Next, data at addresses A+cnt−2 and B+cnt−2 are moved to addresses A+cnt−1 and B+cnt−1. Subsequently, a similar process is repeated. Finally, data at addresses A and B are moved to addresses A+1 and B+1. Next, in step 1305, the latest detection data are written into addresses A and B.

Next, in step 1306, the value of the counter cnt is incremented by 1. By the above, the entire process for storing detection data of the internal pressure of intake manifold and the rotation speed is completed.

Processes in and after step 1302 will now be explained. First, in step 1302, the judgement is made as to whether or not the flag IMVB is "1". If the flag is "1", the flow proceeds to step 1307. If the flag is not "1", the flow goes to step 1310. In step 1310, a variable cnt0 is substituted by the value of (cnt−1). Further, in step 1311, the counter cnt is cleared to 0, thereby completing the processing.

In step 1307, the judgement is made as to whether or not the counter cnt is 0. The flow proceeds to step 1309 if the counter cnt is 0 and to step 1308 if it is not 0.

In step 1308, data at an address C+cnt−1 is moved to an address C+cnt. Next, data at an address C+cnt−2 is moved to an address C+cnt−1. Subsequently, a similar process is repeated. Finally, data at an address C is moved to an address C+1. Next, in step 1309, the latest detection data of the water temperature is written into the address C.

By the foregoing, the explanation of the operation of the program for storage of detection data is completed.

The values of the manifold pressure, rotation speed and water temperature after $10\times k$ (k=0, 1, 2, . . . ) (msec) from the start of acceleration or deceleration are determined as values at address A+cnt0−k, B+cnt0−k and C+cnt0−k, respectively.

Figure 10:
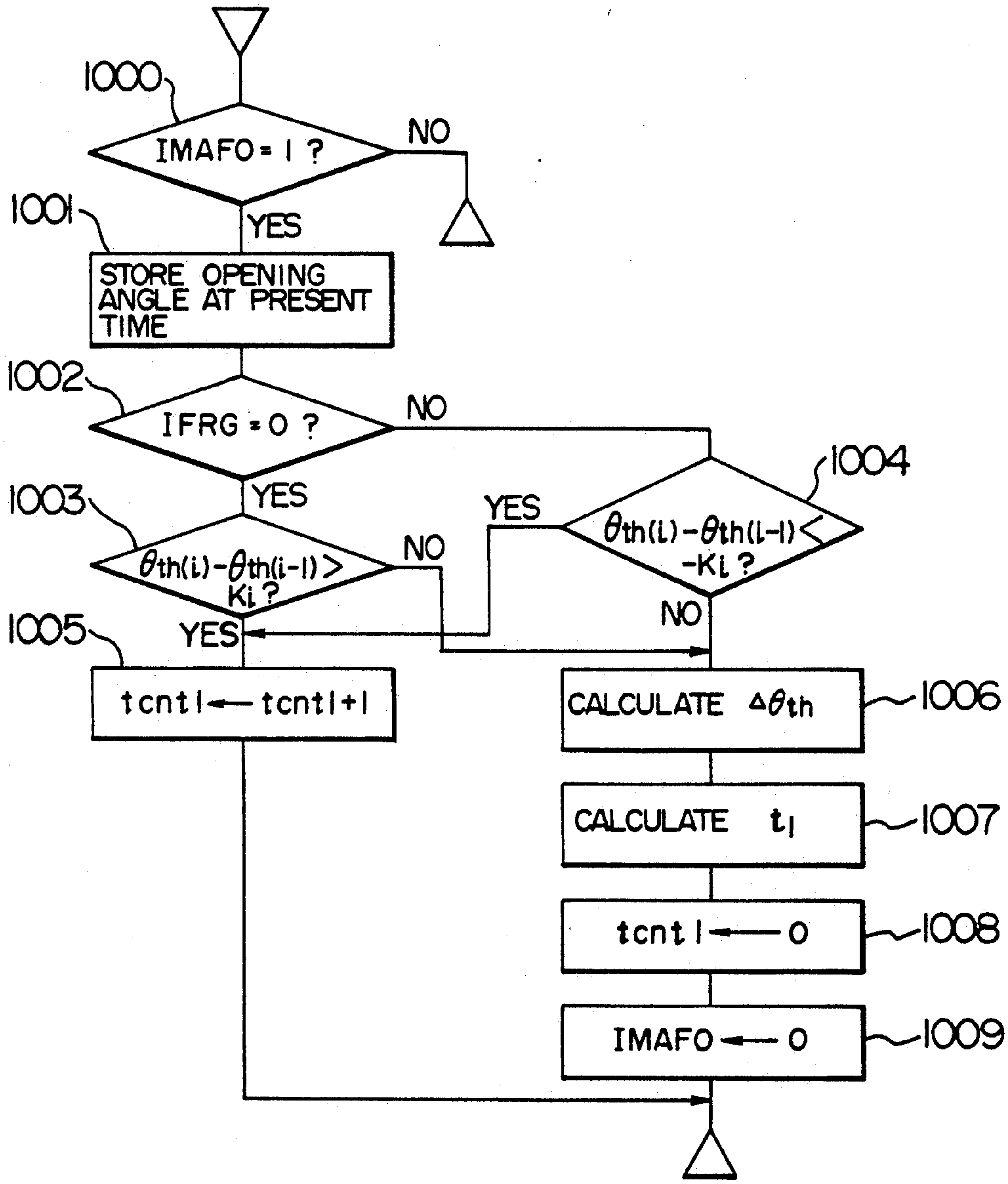
FIG. 10 is a flow chart of a program for calculating the displacement of the throttle opening angle and the time in which the engine is in the initial accelerated or decelerated state.
Figure 11:
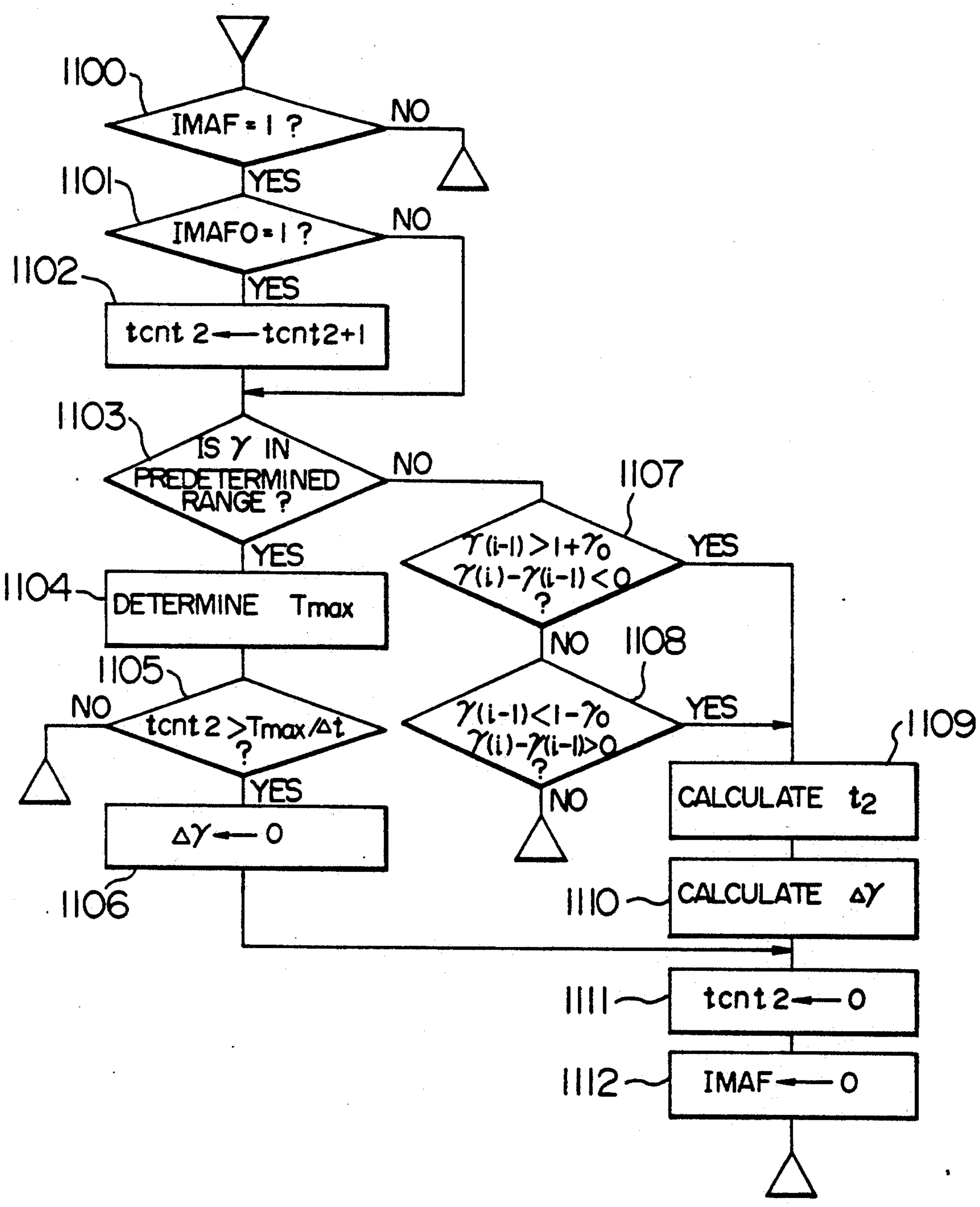
FIG. 11 is a flow chart of a program for calculating the degree of leanness and richness of the air/fuel ratio and the time difference from the time of completion of the acceleration or deceleration until the air/fuel ratio deviates from the target value.

A displacement $\Delta\theta_{th}$ of the throttle opening angle and a time $t_1$ in which the engine is in the initial accelerated or decelerated state, can be determined by the program shown in FIG. 10.

Next, explanation will be made of the operation of a program for determining the degree $\Delta\gamma$ of leanness or richness of the air/fuel ratio in the accelerated or decelerated state, a time difference $t_2$ from the time of completion of the initial accelerated or decelerated state until a predetermined time at which the air/fuel ratio deviates from a target value, a time $t_3$ from the entry into the accelerated or decelerated state until the air/fuel ratio begins to become lean or rich, a time $t_4$ in which the air/fuel ratio is in the lean or rich state, and a time $t_5$ in which the two variables $P_m$ and N are all in a monotonically increasing or decreasing condition in the accelerated or decelerated state. The explanation will be made on the basis of FIGS. 20 to 23.

First, in step 1600, the judgement is made as to whether or not the flag IMAF is "1". If the flag is "1", the flow proceeds to step 1601.

Next, in step 1601, the judgement is made as to whether or not the flag INAF is "0". The flow proceeds step 1602 if the flag is "0" and to step 16071 if the flag is not "0".

In step 1602, the judgement as to whether or not the calculation of the variable $t_5$ has been completed, is made referring to a flag ICAL5. If the value of the flag is "1", it is indicated that the calculation has been completed. In this case, processes in and after step 16071 are performed. If the value of the flag ICAL5 is "0", it is indicated that the calculation is being performed. In that case, processes in and after step 1603 are performed. The initial value of the flag ICAL5 is 0.

In step 1603, the judgement as to whether an engine has been transferred to an accelerated state or a decelerated state, is made referring to a flag IFRG. If the value of the flag IFRG is "0", it is indicated that the engine has been transferred to the accelerated state. If the flag is "1", it is indicated that the engine has been transferred to the decelerated state.

The flow proceeds to step 1604 in the case of the accelerated state and to step 1605 in the case of the decelerated state. In step 1604, the judgement is made as to whether or not the internal pressure $P_m$ of intake manifold and the rotation speed N are in a monotonically increasing condition. The judgement that $P_m$ and N are in a monotonically increasing condition at the present time i, is made if the following relation (69) and (70) are satisfied:

$$P_m(i)-P_m(i-3)>0 \quad \ldots (69)$$

where $P_m$ is the internal pressure of intake manifold and i is a time (one time is equal to 10 msec), and $$N(i)-N(i-3)>0 \quad \ldots (70)$$

where N is the rotation speed and i is a time (one time is equal to 10 msec).

If the monotonically increasing condition is judged, the flow proceeds to step 1608. If the case is not so, processes in and after step 1606 are performed.

In step 1605, the judgement is made as to whether the internal pressure $P_m$ of intake manifold and the rotation speed N are in a monotonically decreasing condition. The judgement that $P_m$ and N are in a monotonically decreasing condition at the present time i, is made if the following relations (71) and (72) are satisfied:

$$P_m(i)-P_m(i-3)<0 \quad \ldots (71)$$

where $P_m$ is the internal pressure of intake manifold and i is a time (one time is equal to 10 msec), and $$N(i)-N(i-3)<0 \quad \ldots (72)$$

where N is the rotation speed and i is a time (one time is equal to 10 msec).

If the monotonically decreasing condition is judged, a process of step 1608 is performed. If the case is not so, processes in and after step 1606 are performed.

In step 1608, the value of a variable tcnt5 corresponding to $t_5$ is incremented by 1. The initial value of this variable is 0.

In step 1606, on the judgement that the monotonically increasing or decreasing condition has been finished, a variable $t_5$ is calculated from the above variable tcnt5 by the following equation:

$$t_5=\Delta t \cdot tcnt5 \quad \ldots (73)$$

Where $\Delta t$ is the period of execution of the program under consideration.

In step 1607, a flag ICAL5 indicating the completion of the calculation of the variable $t_5$ is set to "1". Next, in step 16071, the judgement is made as to whether or not a flag IMAFO is "0". If this flag is "0", a time counter tcnt2 corresponding to a variable $t_2$ is incremented by 1 on the judgement that the accelerated or decelerated state has been completed (step 16072). The initial value of the variable $t_2$ is 0.

Next, in step 1609, the judgement as to whether or not the calculation of a variable $t_3$ has been completed, is made referring to a flag ICAL3. If the flag is "1", it is indicated that the calculation has been completed. If the flag is "0", it is indicated that the calculation is being performed. The initial value of this flag is "0".

In step 1610, the judgement as to whether or not the air/fuel ratio has began to become lean or rich, is made on the following relation:

$$14.7-A/F_0<A/F<14.7+A/F_0 \quad \ldots (74)$$

where A/F is a detection value of the air/fuel ratio and $A/F_0$ is a positive constant.

If the relation (74) is satisfied, the flow proceeds a process of step 1611 on the judgement that the air/fuel ratio has not began to become lean or rich. If the relation (74) is satisfied, processes in and after step 1614 are performed. In step 1611, a variable tcnt3 corresponding to $t_3$ is incremented by 1.

In step 16120, a time range is determined over which an error in control of the air/fuel ratio extends. For that purpose, a table shown in FIG. 12B is searched by means of the rotation speed N and the air quantity $Q_a$ to determine a variable $T_{max}$ indicating the time extension over which the air/fuel ratio control error extends after the completion of the acceleration or deceleration. Table data is obtained by a method shown in FIG. 12A, that is, by measuring a response of the air/fuel ratio when the fuel injection quantity is stepwise changed with various conditions of the engine being kept constant and determining $T_{max}$ as a time from the step-like change until the completion of the response. This measurement is conducted for various rotation speeds and air quantities.

Next, in step 1612, the judgement is made as to whether or not a variable tcnt2 satisfies the relation (43).

If the relation (43) is satisfied, processes in and after step 1613 are performed on the judgement that no variation in air/fuel ratio occurred in the initial accelerated or decelerated state. In step 1613, $\Delta\gamma$ is set to 0. Thereafter, the flow proceeds to step 1633. Processes in and after step 1633 will be mentioned later on.

In step 1614, a flag ICAL3 indicating the completion of the calculation of $t_3$ is set to "1". The initial value of a flag ICAL3 is zero.

Next, in step 1615, the variable $t_3$ is determined by the following equation:

$$t_3 = \Delta t \cdot tcnt3 \quad \ldots (75)$$

where $\Delta t$ is the period of execution of the program under consideration.

Next, in step 1616, the value of a variable tcnt4 corresponding to $t_4$ is incremented by 1. The initial value of a variable tcnt4 is "0".

In step 1617, the confirmation is made as to whether or not the detection value A/F of the air/fuel ratio is equal to or larger than a theoretical air/fuel ratio 14.7. If A/F is equal to or larger than the theoretical air/fuel ratio, processes in and after step 1618 are performed. If the case is not so, processes in and after step 1619 are performed.

In step 1618, the confirmation is made as to whether or not the air/fuel ratio satisfies the following relation:

$$A/F(i) - A/F_m > 0 \quad \ldots (76)$$

where i is a time (one time is equal to 10 msec). The flow proceeds to step 1620 if the relation (76) is satisfied and to step 1622 if the relation (76) is not satisfied.

In step 1620, a variable $A/F_m$ is substituted by A/F(i). The foregoing processes mean that the variable $A/F_m$ is substituted by the maximum of the detection value of the air/fuel ratio. The initial value of the variable $A/F_m$ is 14.7.

In step 1619, the confirmation is made as to whether or not the air/fuel ratio satisfies the following relation:

$$A/F(i) - A/F_m < 0 \quad \ldots (77)$$

where i is a time (one time is equal to 10 msec). The flow proceeds to step 1620 if the relation (77) is satisfied and to step 1622 if the relation (77) is not satisfied. The above processes in and after step 1619 mean that the variable $A/F_m$ is substituted by the minimum of the detection value of the air/fuel ratio.

Next, in step 1622, the degree $\Delta\gamma$ of leanness or richness of the air/fuel ratio is calculated by the following equation:

$$\Delta\gamma = k_h \cdot (A/F_m - 14.7) \quad \ldots (78)$$

where $k_h$ is a positive constant.

Next, in step 1624, the judgement is made as to whether or not a flag ICAL2 is "1". If the flag is "1", the flow proceeds to step 1631 on the judgement that the calculation of the variable $t_2$ has been completed. The initial value of the flag ICAL2 is 0. Next, in step 1625, the judgement is made as to whether or not the air/fuel ratio A/F is larger than 14.7. The flow proceeds to step 1626 if A/F is larger than 14.7 and to step 1627 if it is not larger than 14.7.

In step 1626, the judgement is made as to whether or not the air/fuel ratio A/F satisfies the following relation:

$$A/F(i) - A/F(i-3) < 0 \quad \ldots (79)$$

Where i is a time (one time is equal to the period of sampling of the air/fuel ratio). The flow proceeds to step 1628 if the relation (79) is satisfied and to step 1631 if it is not satisfied.

In step 1627, the judgement is made as to whether or not the air/fuel ratio satisfies the following relation:

$$A/F(i) - A/F(i-3) > 0 \quad \ldots (80)$$

where i is a time (one time is equal to the period of sampling of the air/fuel ratio). The flow proceeds to step 1628 if the relation (80) is satisfied and to step 1631 if it is not satisfied.

In step 1628, the variable $t_2$ is calculated in accordance with the following equation:

$$t_2 = \Delta t \cdot tcnt2 \quad \ldots (81)$$

Next, in step 1629, "1" is set into the flag ICAL2. Next, in step 1631, the judgement is made as to whether or not the following relation is satisfied:

$$14.7 - A/F_1 < A/F < 14.7 + A/F_1 \quad \ldots (82)$$

where A/F is the detection value of the air/fuel ratio and $A/F_1$ is a positive constant.

If the relation (82) is satisfied, processes in and after step 1632 are performed. If the case is not so, the processing is completed.

In step 1632, the variable $t_4$ is calculated by the following equation:

$$t_4 = \Delta t \cdot tcnt4 \quad \ldots (83)$$

Next, in step 1633, the flag ICAL2 is turned to "0". Next, in step 1634, the flag ICAL3 is turned to "0". Next, in step 1635, the flag ICAL5 is turned to "0". Next, in step 1636, the flag IMAF is turned to "0". In and after step 1637, the variables tcnt2, tcnt3, tcnt4 and tcnt5 are all turned to 0 and $A/F_m$ is substituted by 14.7, thereby completing the entire processing.

The foregoing is an on-line parameter matching method. The present invention is also applicable to off-line parameter matching.

According to the present invention, since parameters of a fuel control system can be set automatically, it is possible to greatly reduce the number of steps for development of a system. Also, it is possible to ensure the performance of air/fuel ratio control with an adaptability to a temporal change of an engine.

What is claimed is:

1. A learning control method for an electric engine control system in which (1) engine condition values indicative of an operating state of an engine are detected, (2) an adhesion rate indicative of a rate of adhesion of injected fuel onto a wall surface of an intake manifold and a runaway rate indicative of a rate of carrying away the fuel staying in the intake manifold into a cylinder are calculated in accordance with the detected engine condition values, (3) a target air/fuel ratio is determined from the engine condition values, (4) a fuel injection rate is controlled to bring an actual air/fuel ratio into conformity with the target air/fuel ratio on the basis of the adhesion rate and the runaway rate, said method comprising the steps of:

(a) determining a deviation of the actual air/fuel ratio from said target air/fuel ratio at least when the engine changes from a steady state to one of an accelerating state and a decelerating state;

(b) calculating at least an adhesion rate correction factor for said adhesion rate in accordance with at least said deviation of the actual air/fuel ratio from said target air/fuel ratio in accordance with a rule based inference, said rule-based inference using rules including:

(1) in the accelerating state of the engine, in response to the actual air/fuel ratio becoming larger than the target air/fuel ratio, changing the adhesion rate correction factor to make said adhesion rate larger;

(2) in the accelerating state of the engine, in response to the actual air/fuel ratio becoming smaller than the target air/fuel ratio, changing the adhesion rate correction factor to make said adhesion rate smaller;

(3) in the decelerating state of the engine, in response to the actual air/fuel ratio becoming larger than the target air/fuel ratio, changing the adhesion rate correction factor to make said adhesion rate smaller; and, (4) in the decelerating state of the engine, in response to the actual air/fuel ratio becoming smaller than the target air/fuel ratio, changing said adhesion rate to make said adhesion rate larger;

(c) correcting at least said adhesion rate with said adhesion rate correction factor; and (d) redetermining and controlling said fuel injection rate in accordance with the corrected adhesion rate and the runaway rate.

2. A learning control method according to claim 1, further including:

(b) calculating a runaway rate correction factor for said runaway rate in accordance with at least said deviation of the actual air/fuel ratio from said target air/fuel ratio in accordance with a rule based inference, said rule-based inference using rules including:

(1) in the accelerating state of the engine, in response to the actual air/fuel ratio becoming larger than the target air/fuel ratio, changing the runaway correction factor to make said runaway rate smaller at the same engine condition;

(2) in the accelerating state of the engine, in response to the actual air/fuel ratio becoming smaller than the target air/fuel ratio, changing the runaway rate correction factor to make said runaway rate larger at the same engine condition;

(3) in the decelerating state of the engine, in response to the actual air/fuel ratio becoming larger than the target air/fuel ratio, changing the runaway rate correction factor to make said runaway rate larger at the same engine condition; and, (4) in the decelerating state of the engine, in response to the actual air/fuel ratio becoming smaller than the target air/fuel ratio, changing said runaway rate to make said runaway rate smaller at the same engine condition;

further including (c) correcting at least said runaway rate with said runaway rate correction factor; and (d) redetermining and controlling said fuel injection rate in accordance with the corrected adhesion rate and the corrected runaway rate.

3. A learning control method according to claim 2, further comprising a step of further using, a time difference between a predetermined time of completion of one of the accelerating and decelerating states and a predetermined time at which the actual air/fuel ratio deviates from the target air/fuel ratio, as input information of said rule-based inference a ratio of the correction of the adhesion rate to the correction of the runaway rate being changed in accordance with said time difference.

4. A learning control method according to claim 2, further comprising a step of further using at least one of:

a time period from a start of one of the accelerating and decelerating to an end of the one of the accelerating and decelerating, a displacement of an opening angle of a throttle, at least one of an air quantity and an internal pressure of the intake manifold in a range of said time, as input information to said rule-based inference.

5. A learning control method according to claim 2, further comprising a step of changing the degree of correction of the runaway rate in accordance with the degree of deviation of the air/fuel ratio from the target value.

6. A learning control method according to claim 1, wherein the deviation determining step includes determining said deviation of the actual air/fuel ratio from the target air/fuel ratio on the basis of one of a maximum and a minimum of in a predetermined period of a correction factor for a fuel injection rate based on an output of an oxygen sensor disposed in a path of an exhaust gas in the engine.

7. A learning control method according to claim 1, further comprising a step of changing a degree of correction of the adhesion rate correction factor in accordance with the degree of deviation of the actual air/fuel ratio from the target air/fuel ratio.

8. A learning control method according to claim 1, further comprising a step of further using at least one of:

a time period from a start of one of the accelerating and decelerating to an end of the one of the accelerating and decelerating, a displacement of an opening angle of a throttle, at least one of an air quantity and an internal pressure of the intake manifold in a range of said time, as input information to said rule-based inference.

9. A learning control method according to claim 1, wherein said rule-based inference uses a fuzzy inference.

10. A learning control method for an electric engine control system in which (1) engine condition values indicative of an operating state of an engine are detected, (2) an adhesion rate indicative of a rate of adhesion of injected fuel onto a wall surface of an intake manifold and a runaway rate indicative of a rate of carrying away the fuel staying in the intake manifold into a cylinder are calculated in accordance with the detected engine condition values, (3) a target air/fuel ratio is determined from said engine condition values (4) a fuel injection rate is controlled to bring an actual air/fuel ratio into conformity with the target air/fuel ratio on the basis of the adhesion rate and the runaway rate, said method comprising the steps of:

(a) determining a deviation of the actual air/fuel ratio from said target air/fuel ratio at least when the engine changes from a steady state to one of an accelerating state and a decelerating state;

(b) in response to a control error in the fuel injection rate in which control error the actual air/fuel ratio deviates from the target air/fuel ratio, determining a range of variation of the detected engine condition values used for calculating the adhesion rate and runaway rate;

(c) correcting a corresponding relationship between the operating state of the engine within said range of variation and said adhesion rate and said runaway rate in accordance with a rule-based inference using rules including:

(1) in an accelerating state of the engine, in response to the actual air/fuel ratio becoming larger than the target air/fuel ratio, enlarging said adhesion rate within range of variation;

(2) in the accelerating state of the engine, in response to the actual air/fuel ratio becoming smaller than the target air/fuel ratio, reducing said adhesion rate within said range of variation;

(3) in a decelerating state of the engine, in response to the actual air/fuel ratio becoming larger than the target air/fuel ratio, reducing said adhesion rate within said range of variation; and (4) in the decelerating state of the engine, in response to the air/fuel ratio becoming smaller than the target air/fuel ratio, enlarging said adhesion rate within said range of variation.

11. A learning control method according to claim 10, wherein using said rule-based inference rules further includes:

(1) in the accelerating state of the engine, in response to the actual air/fuel ratio becoming larger than the target air/fuel ratio, reducing said runaway rate within said range of variation;

(2) in the accelerating state of the engine, in response to the actual air/fuel ratio becoming smaller than the target air/fuel ratio, enlarging said runaway rate within said range of variation;

(3) in the decelerating state of the engine, in response to the actual air/fuel ratio becoming larger than the target air/fuel ratio, enlarging said runaway rate within said range of variation; and (4) in a decelerating state of the engine, in response to the air/fuel ratio becoming smaller than the target air/fuel ratio, reducing said runaway rate within said range of variation.

12. A learning control method according to claim 11, further including using a time difference from a predetermined time in one of the accelerating and decelerating states until a predetermined time at which the actual air/fuel ratio deviates from the target air/fuel ratio as further input information of said rule-based inference a ratio of the correction of the adhesion rate to a correction of the runaway rate being changed in accordance with said time difference.

13. A learning control method according to claim 12, wherein said rule-based inference uses a fuzzy inference.

14. A learning control method according to claim 11, wherein at least one of:

a time period from a start of one of the accelerating and decelerating to an end of the one of the accelerating and decelerating, a displacement of an opening angle of a throttle, at least one of an air quantity and an internal pressure of the intake manifold in a range of said time are used as input information to said rule-based inference.

15. A learning control method according to claim 11, wherein said rule-based inference further includes a rule of changing a degree of increase and decrease of the runaway rate in accordance with the deviation of the actual air/fuel ratio from the target air/fuel ratio.

16. A learning control method according to claim 15, wherein said rule-based inference uses a fuzzy inference.

17. A learning control method according to claim 11, wherein said rule-based inference uses a fuzzy inference.

18. A learning control method according to claim 10, wherein at least one of:

a time period from a start of one of the accelerating and decelerating to an end of the one of the accelerating and decelerating, a displacement of an opening angle of a throttle, at least one of an air quantity and an internal pressure of the intake manifold in a range of said time are used as input information to said rule-based inference.

19. A learning control method according to claim 18, wherein said rule-based inference uses a fuzzy inference.

20. A learning control method according to claim 10, wherein said rule-based inference further includes a rule of changing a degree of increase and decrease of the adhesion rate in accordance with the deviation of the actual air/fuel ratio from the target air/fuel ratio.

21. A learning control method according to claim 20, wherein said rule-based inference uses a fuzzy inference.

22. A learning control method according to claim 10, wherein said rule-based inference uses a fuzzy inference.

* * * * *